United States Patent [19]

Niihara

[11] Patent Number: 5,049,991
[45] Date of Patent: Sep. 17, 1991

[54] MOVEMENT COMPENSATION PREDICTIVE CODING/DECODING METHOD

[75] Inventor: Takami Niihara, Yokosuka, Japan

[73] Assignee: Victor Company of Japan, Ltd., Yokohama, Japan

[21] Appl. No.: 482,178

[22] Filed: Feb. 20, 1990

[30] Foreign Application Priority Data

Feb. 20, 1989 [JP] Japan .................................. 1-41347

[51] Int. Cl.$^5$ ........................................... H04N 7/137
[52] U.S. Cl. .................... 358/136; 358/105; 358/135
[58] Field of Search ................ 358/133, 135, 136, 105

[56] References Cited

U.S. PATENT DOCUMENTS

| | | | |
|---|---|---|---|
| 4,383,272 | 5/1983 | Netravali | 358/136 |
| 4,485,402 | 11/1984 | Searby | 358/160 |
| 4,862,264 | 8/1989 | Wells | 358/136 |
| 4,985,766 | 1/1991 | Morrison | 358/133 |
| 4,985,768 | 1/1991 | Sugiyama | 358/136 |

OTHER PUBLICATIONS

"Motion-Compensated Interframe Coding . . . ", Koga et al., Nippon Electric Co., Shingaku Giho References for Picture Technology, IE 81-54.
"Adaptive Predition of Motion Compensation . . . ", Koga et al., NEC Corp., Television Scientific Society Bulletin, vol. 39, No. 10, pp. 963-771 (1985).

Primary Examiner—Howard W. Britton
Attorney, Agent, or Firm—Michael N. Meller

[57] ABSTRACT

A movement compensation predictive coding method including: a first step of detecting a movement vector $MV_M$ between the N-th frame ($N \geq 0$) and the (N+M)-th frame ($M \geq 2$), the vector $MV_M$ being assumed as an initial value of a difference movement vector MVe, and to detect a movement vector MVi between the (N+1)-th frame (i=0, 1, 2, ..., M−1) and (N+i+1)-th frame; a second step wherein a detected movement vector MVi exists in the vicinity of a predictive movement vector MVe/(M−i) predicted from the difference movement vector, the predictive vector MVe/(M−i) is assumed as a correct movement vector, and a movement compensation predictive coding is carried out from pixels predicted by using pixels in the vicinity of the coordinate indicated by the predictive vector MVe/(M−i), and obtaining a first subsegment difference movement vector, by subtracting the predictive vector MVe/(M−i) from the difference vector MVe; and a third step wherein when no detected movement vector MVi exists in the vicinity of a predictive movement vector MVe/(M−i), the detected vector MVi is assumed as a movement vector, and a movement compensation predictive coding is carried out using the vector MVi, and obtaining a second subsegment movement vector by subtracting the movement vector from the difference vector MVe.

10 Claims, 27 Drawing Sheets

MOVEMENT COMPENSATION PREDICTIVE CODING/DECODING METHOD

BACKGROUND OF THE INVENTION

This invention relates to an improvement in a movement compensation predictive coding/decoding method for effecting a bandwidth compression and expansion of a digital moving picture.

As the technique for carrying out an efficient coding of a moving picture, a movement compensation interframe predictive coding technique is known. In accordance with this technique, movement of a picture between frames is first detected for every pixel or every block, each comprised of a plurality of pixels. Then, a picture is newly synthesized, using this movement vector, from the pixels of a decoded picture one frame before, and a difference between a current frame and the synthesized picture and the movement vector are coded. Furthermore, in the decoding system, the above-mentioned difference and movement vector are decoded. Then, the current frame is decoded using the decoded picture of the preceding frame.

Block diagrams of conventional coding and decoding systems are shown in FIGS. 1 and 2, respectively.

Initially, the conventional coding system will be described. In the coding system shown in FIG. 1, an input picture O comprised of L×M pixels exists in a frame memory (hereinafter abbreviated as FM) 1. Furthermore, a decoded picture one frame before, which is comprised of L×M pixels, exists in a decode frame memory (hereinafter abbreviated as DFM) 2.

When a scene change is detected as a result of comparison of a picture of the current frame with a decoded picture of the preceding frame at a scene change detector (hereinafter abbreviated as SCNG) 3, or at the time of start of coding, an intraframe coding is conducted at an intraframe encoder (hereinafter abbreviated as ENC-INT) 4. The code thus obtained is inputted to code buffer (hereinafter abbreviated as BUF) 14 through selector (hereinafter abbreviated as 1st SEL) 5. Furthermore, an output from the ENC-INT 4 is inputted to an intraframe decoder (hereinafter abbreviated as DEC-INT) 6, at which the intraframe decoding is performed. The output thus decoded is inputted to the DFM 2 through a selector (abbreviated as SEL0) 7.

In contrast, when no scene change is detected, detection of a movement vector between frames is made by a movement compensation circuit (hereinafter abbreviated as MC) 8 by comparison with a decoded picture D in the DFM 2. Thus, a synthesized picture G is formed by the decoded picture in the DFM 2 and the movement vector. The movement vector is coded by a movement vector encoder (hereinafter abbreviated as an ENC-MV) 9. Furthermore, a difference between the synthesized picture G and the input picture O is coded at a difference encoder (hereinafter abbreviated as ENC-DIF) 10. Then, the coded output is decoded at a difference decoder (hereinafter abbreviated as DEC-DIF) 11. The decoded output is delayed at a delay circuit (hereinafter abbreviated as FD) 12, and is then inputted to the DFM 2 through the SEL0 7.

After a code of the movement vector, a code of difference, and code of presence or absence of scene change are multiplexed by a multiplexer (hereinafter abbreviated as SAF) 13, and then inputted to a buffer for code (hereinafter abbreviated as BUF) 14 through the 1st SEL 5. The codes in the BUF 14 are sequentially outputted in accordance with the status of the transmission path.

The conventional decoding system will now be described with reference to FIG. 2. In the coding system, a code from the transmission path is once stored in a buffer 19. The transfer speed of the code is adjusted and is then outputted. When the code of scene change is detected at a scene change decoder (hereinafter abbreviated as SCNG-DEC) 20 of the decoding system, the code which has been subjected to intraframe coding by the coding system is delivered to an intraframe decoder (DEC-INT) 22 through a selector (hereinafter abbreviated as SFL0) 21. The picture decoded by the DEC-INT 22 is delivered to a frame memory for decoded pictures (hereinafter abbreviated as DFM) 24 through a first selector (hereinafter abbreviated as 1st SEL) 23 and is outputted through a second selector (hereinafter abbreviated as 2nd SEL) 25.

When no code of scene change is detected, the code from the BUF 19 is divided into the movement vector and the code of difference at the selector SEL0 21. The code of the movement vector is decoded at a movement vector decoder (hereinafter DEC-MV) 26, and the code of difference is decoded at the difference code decoder (not shown).

The decoded movement vector is delivered to a movement compensation circuit (hereinafter abbreviated as MC) 27. A decoded picture before one frame in the DFM 24 is delivered to the MC 27. Using this decoded picture, a synthesized picture G is formed from the movement vector by the MC 27. Furthermore, a decoded picture of the current frame is formed by the sum of the decoded difference picture and the synthesized picture, and is then outputted. After the output thus obtained is delayed at delay circuit (hereinafter abbreviated as a FD) 28, it is delivered to DFM 24. The output thus delivered is used for decoding operation of the next frame.

Meanwhile, in the above-described coding system, when the movement vector is detected within the range of ±N pixels, correlation between blocks in an input picture and (2N+1)×(2N+1) blocks in the vicinity of corresponding positions in the decoded picture is determined by using the evaluation function. The detection of the movement vectors is made by the difference between the position of the highly correlative blocks and the positions of the blocks in the input picture.

As stated above, in the prior art, where the movement vector is searched within the range of ±N pixels, the movement vector is determined by the evaluation of correlation with respect to (2N+1)×(2N+1) blocks between frames or fields, so the resolution of the movement vector was one pixel.

For this reason, the movement vector detected when a picture is moving by 0.5 pixels between frames becomes "0" or "1" in dependency upon the positions of blocks. Accordingly, there were the following problems: The movement cannot be smoothly expressed; degradation of the picture quality takes place because movement differs for each block; demand for the transfer capacity increases due to an increase in the difference data, and the like.

SUMMARY OF THE INVENTION

This invention has been made in light of the above-mentioned problems and its object is to provide a movement compensation predictive coding and decoding method capable of improving the resolution of the movement vector to therefore provide a satisfactory picture quality, and which is capable of reducing the quantity of codes to lessen the burden in transmission.

A method according to one principal inventions includes: a first step of detecting a movement vector $MV_M$ between the N-th frame ($N \geq 0$) and the (N+M)-th frame ($M \geq 2$) to take it as an initial value of a difference movement vector MVe, and to detect a movement vector MVi between the (N+1)-th frame (i=0, 1, 2, .., M−1) and the (N+i+1)-th frame; a second step wherein a detected movement vector MVi exists in the vicinity of a predictive movement vector MVe/(M−i)—the quotient is abbreviated MVei—predicted from the difference movement vector, the predictive movement vector MVe/(M−i) is taken as a correct movement vector, and a movement compensation predictive coding is carried out from pixels predicted using pixels in the vicinity of the coordinate indicated by the predictive movement vector MVe/(M−i) to take, as a next error movement vector, a vector obtained by subtracting the predictive movement vector MVe/(M−i) from the error movement vector MVe; and a third step wherein when no detected movement vector MVi exists in the vicinity of a predictive movement vector MVe/(M−i), the predictive movement vector MVi is taken as a movement vector, and a movement compensation predictive coding is carried out using the movement vector MVi to take, as a next movement vector, a vector obtained by subtracting the movement vector from the error movement vector MVe, the processing at the above-mentioned first to third steps being carried out every M frames.

Another principal invention resides in a movement compensation interframe predictive decoding method for decoding coded data which has been subjected to movement compensation predictive coding by the above-mentioned method, the decoding method including: a fourth step wherein when an error movement vector is used in coding, a predictive decoding is carried out using pixels predicted by the same predictive means as those of the coding system by pixels in the vicinity of the coordinate indicated by a predictive movement vector MVe/(M−i) predicted from the error movement vector to take, as a next difference movement vector, a vector obtained by subtracting the predictive movement vector MVe/(M−i) from the difference movement vector; and a fifth step wherein when a predictive coding is carried out using a movement vector (MVi) between the (N+i)-th frame and the (N+i+1)-th frame, an interframe predictive decoding is carried out using the movement vector MVi to take, as a next movement vector, a vector obtained by subtracting the movement vector MVi from the error movement vector MVe.

This invention provides a coding system featured below: An approach is employed to determine movement vectors ($MV_M$) between M frames every M frames ($M \geq 2$) to take it as an initial value of an error or difference movement vector (MVe), to therefore determine movement vectors (MVi) (i=0, 1, ..., M−1) between successive frames. When the error movement vector (MVe) and a predictive movement vector (MVei) predicted from the number of remaining frames exist in the vicinity of a movement vector (MVi) between frames, the predictive movement vector (MVei) in the vicinity of the movement vector (MVi) between frames is taken as a movement vector (MV). In contrast, when no predictive movement vector (MVei) exists in the vicinity of the movement vector (MVi) between frames, the movement vector (MVi) between frames is taken as a movement vector (MV). Furthermore, a vector obtained by subtracting the movement vector (MV) from the error movement vector (MVe) is taken as a next error movement vector to perform a movement compensation using the movement vector (MV), to therefore code a movement vector ($MV_M$) between M frames, a movement vector (MVi) between frames, and a difference by the movement compensation.

On the other hand, this invention also provides a decoding method featured below: The movement vector ($MV_M$) between M frames, the movement vector (MVi) between frames, and the code of a difference by the movement compensation are decoded. When the difference movement vector and the predictive movement vector (MVei) predicted by the number of frames are used in the coding system, the predictive movement vector (MVei) is taken as a movement vector (MV). Furthermore, when a movement vector (MVi) between frames is used, the movement vector (MVi) between frames is taken as a movement vector (MV). A vector obtained by subtracting the movement vector (MV) from the difference movement vector (MVe) is taken as a next error movement vector to carry out a movement compensation interframe predictive coding using an interframe difference by the movement vector (MV) and the movement compensation.

DETAILED DESCRIPTION OF THE PREFERRED EMBODIMENTS

Preferred embodiments of this invention will now be described.

Reference is made to three embodiments according to this invention. Initially, in accordance with the first embodiment, as shown in FIG. 3(a), an approach is employed to carry out an intraframe coding at the time of the start of coding and after scene change to determine movement vectors of M frames every M frames (coded subsegments) between scene changes (coded segments), to thus carry out a movement compensation interframe predictive coding.

Figure 1:
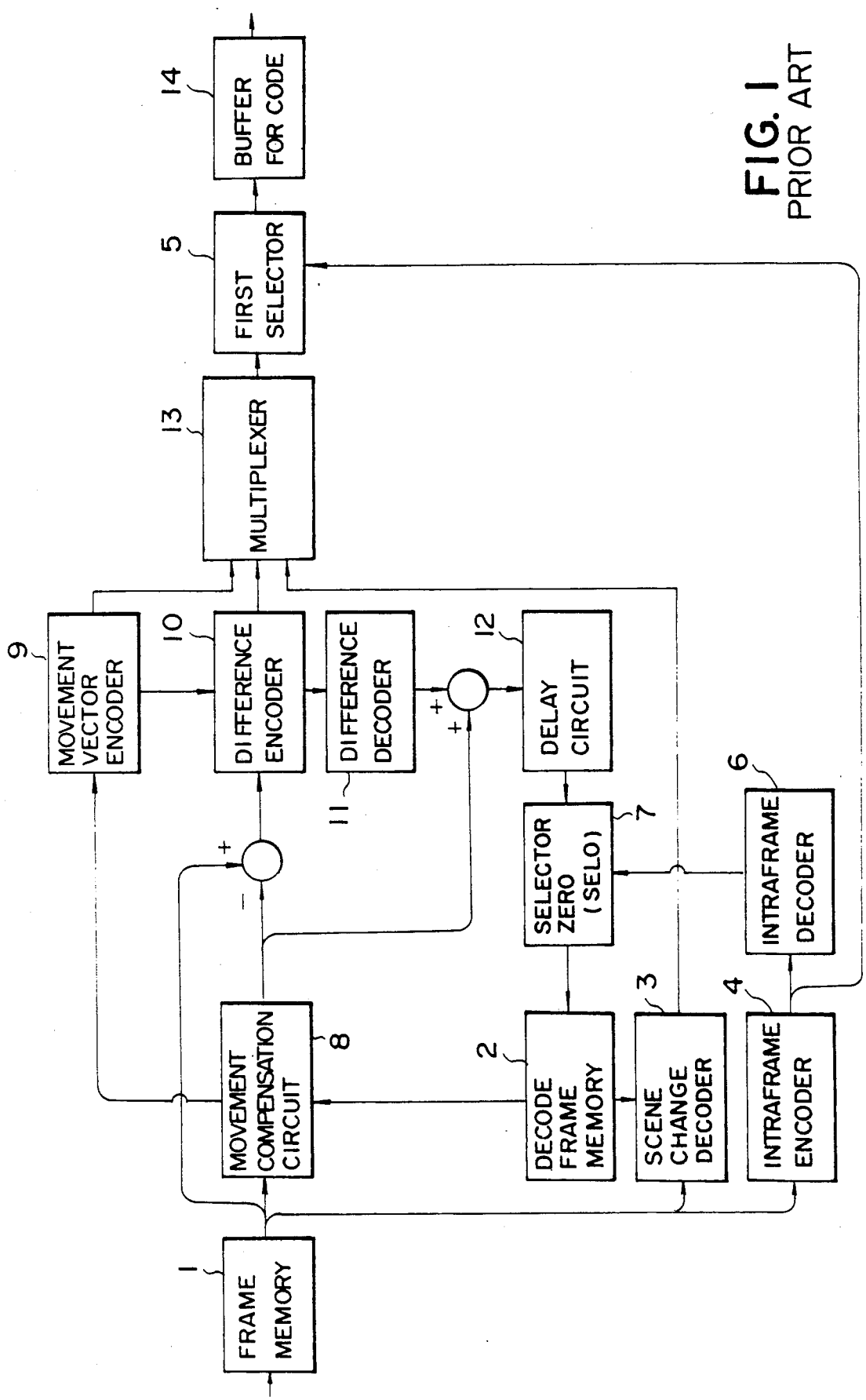
FIGS. 1 and 2 are block diagrams showing the coding system and the decoding system in a conventional coding/decoding system, respectively.
Figure 2:
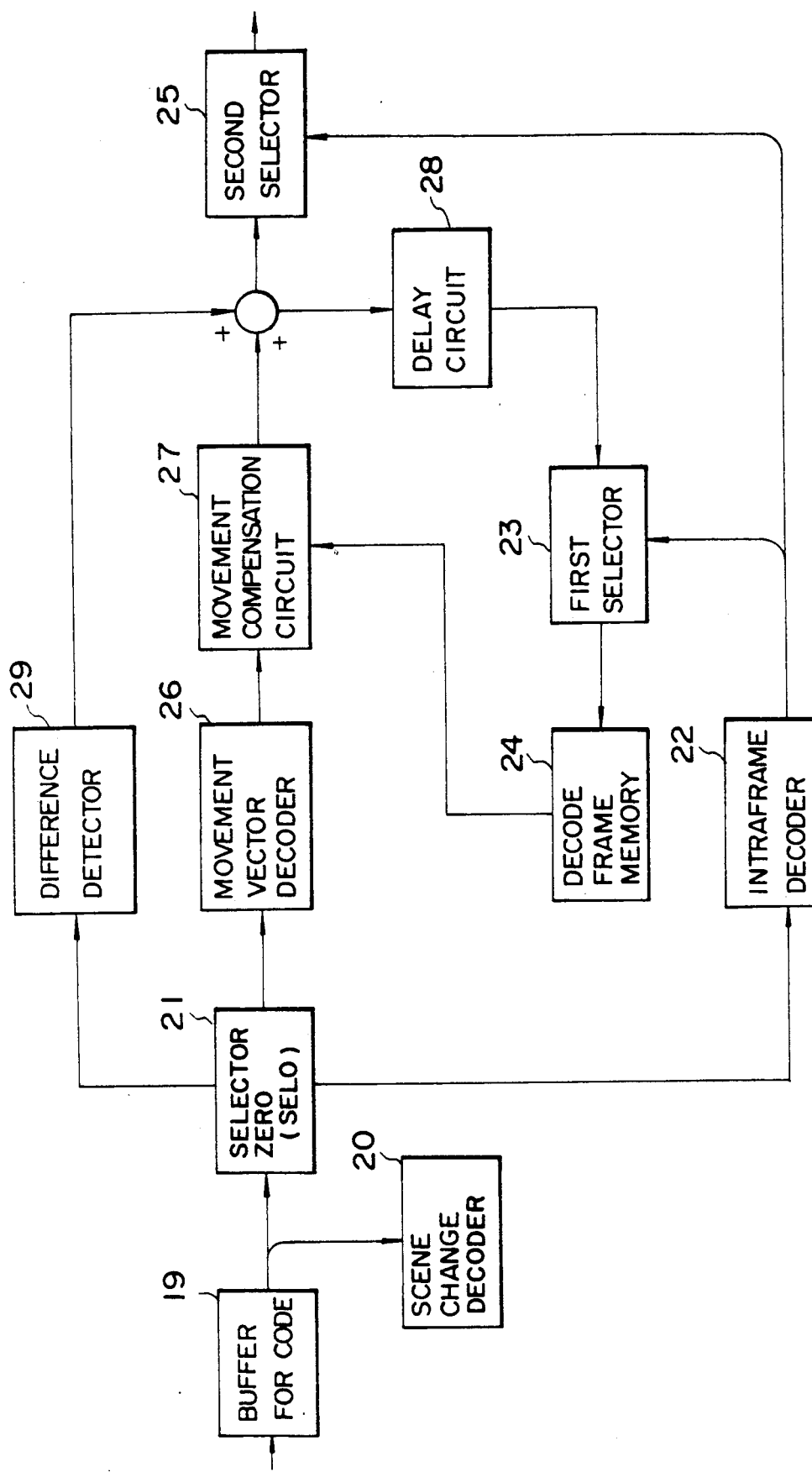
Figure 3:
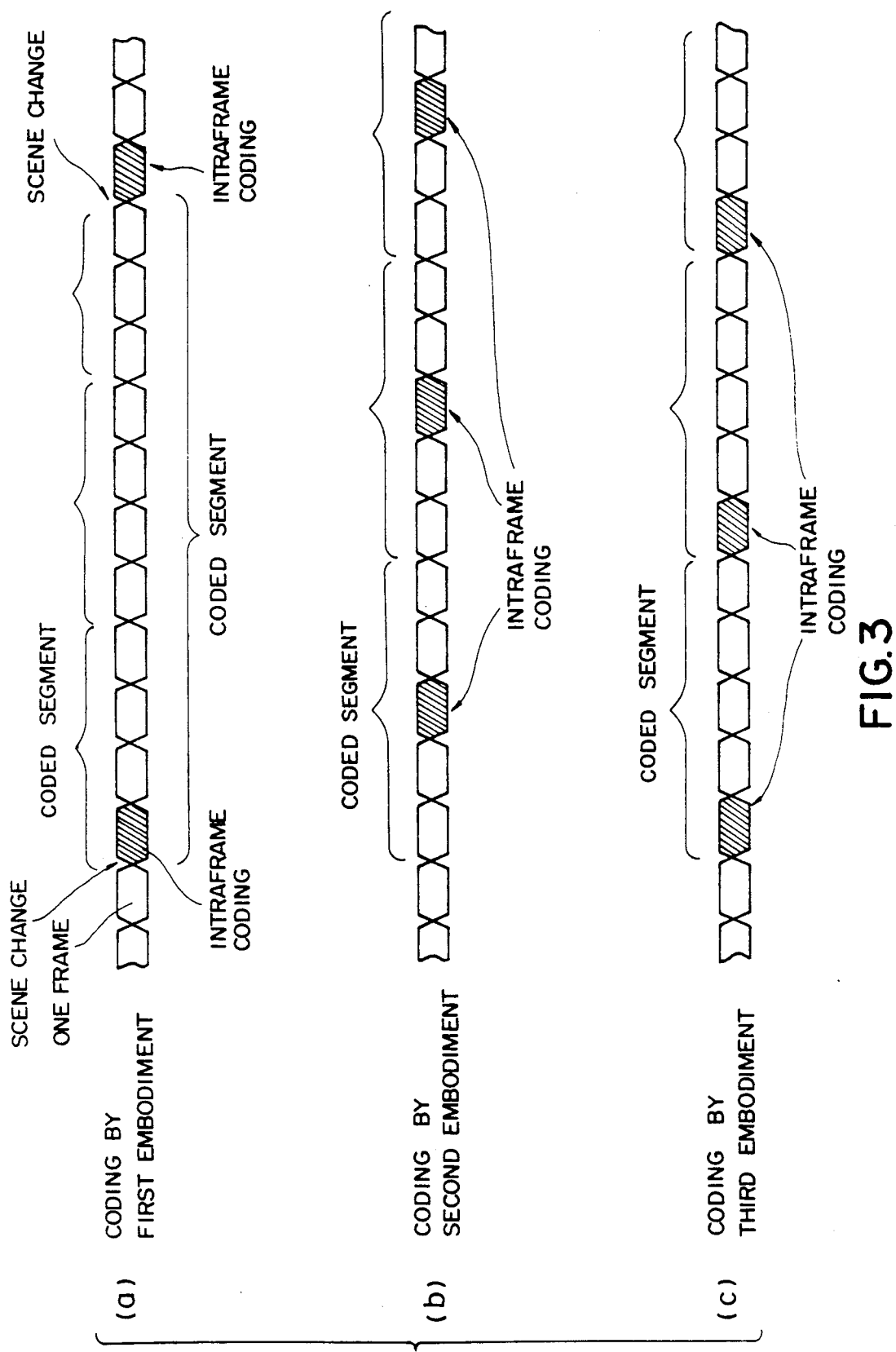
FIG. 3 is a characteristic diagram showing the outline of the operation of a coding system according to a first embodiment of this invention.

In accordance with the second embodiment, as shown in FIG. 3(b), an approach is employed to carry out an intraframe coding every M frames (coded segments) and a movement compensation interframe predictive coding using movement vectors between (M−1) frames, to thus conduct an intraframe coding of the central portions of the M frames.

In accordance with the third embodiment, as shown in FIG. 3(c), an approach is employed to carry out an intraframe coding every M frames (coded segments) and a movement compensation interframe predictive coding using movement vectors, to thus conduct an intraframe coding of the leading portions of the M frames. These coding methods will now be described in succession.

First Embodiment

Figure 4:
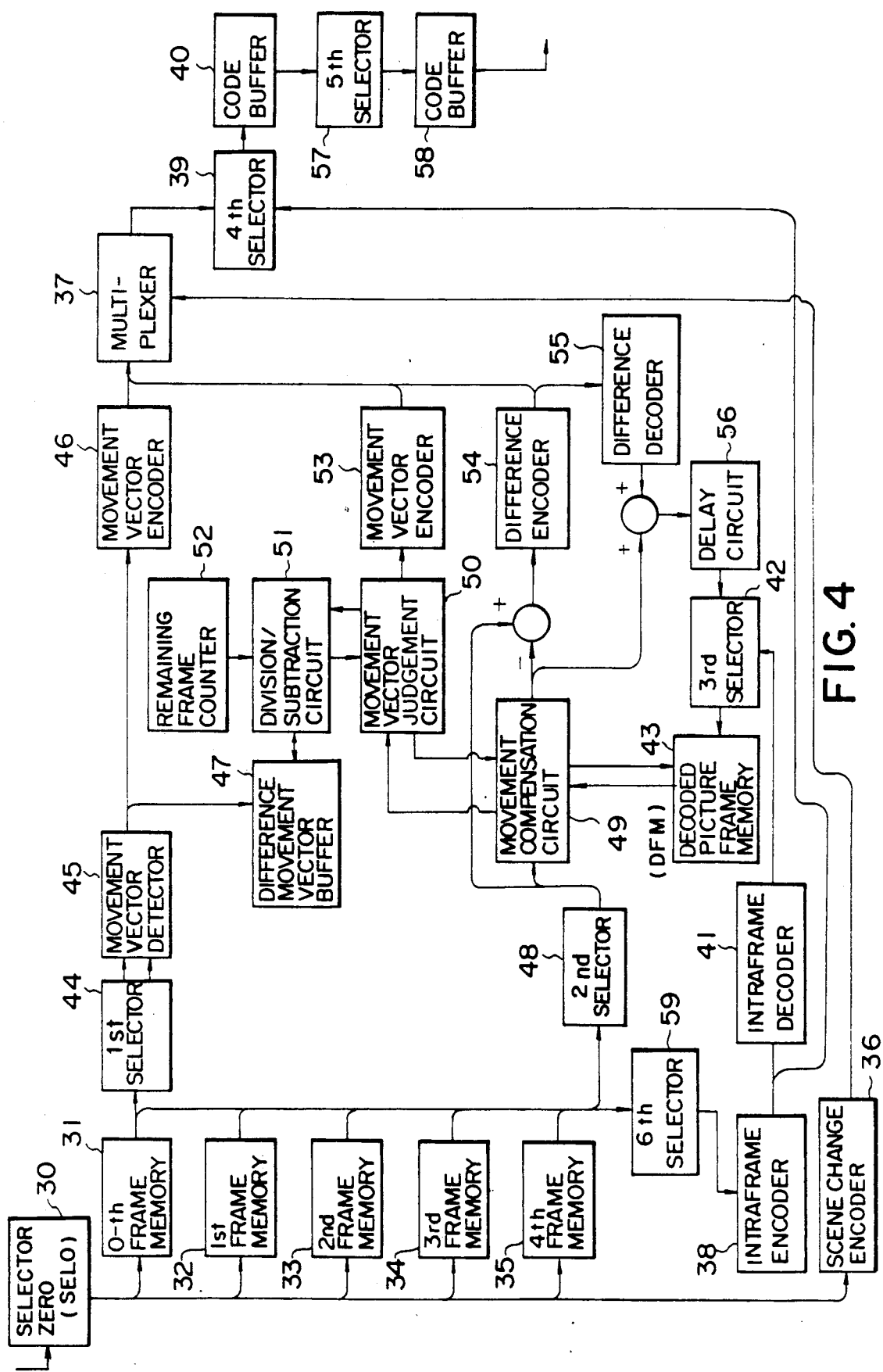
FIG. 4 is a block diagram showing a coding system according to first to third embodiments of this invention.
Figure 6:
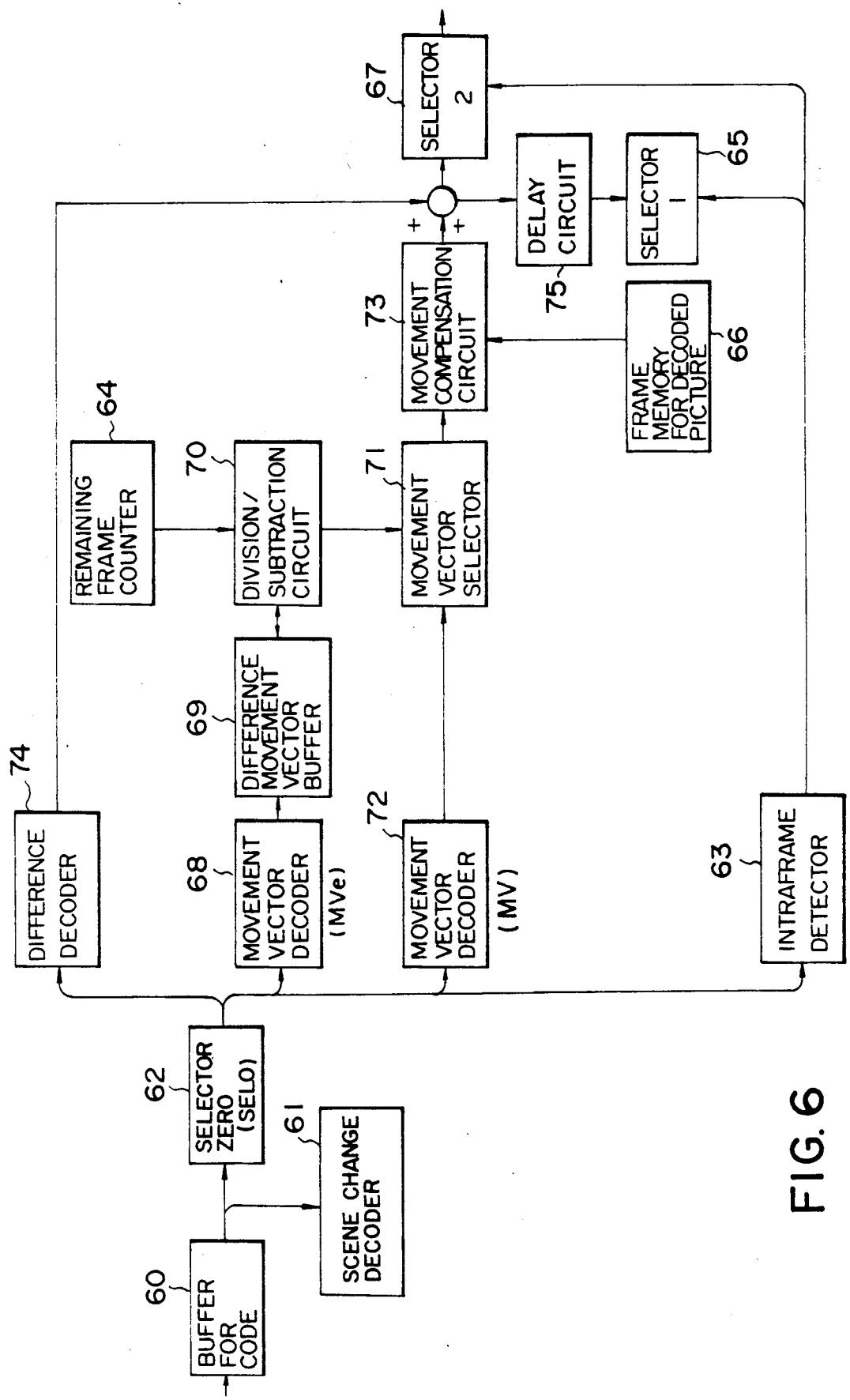
FIG. 6 is a block diagram showing a decoding system according to a first embodiment of this invention.
Figure 7A:
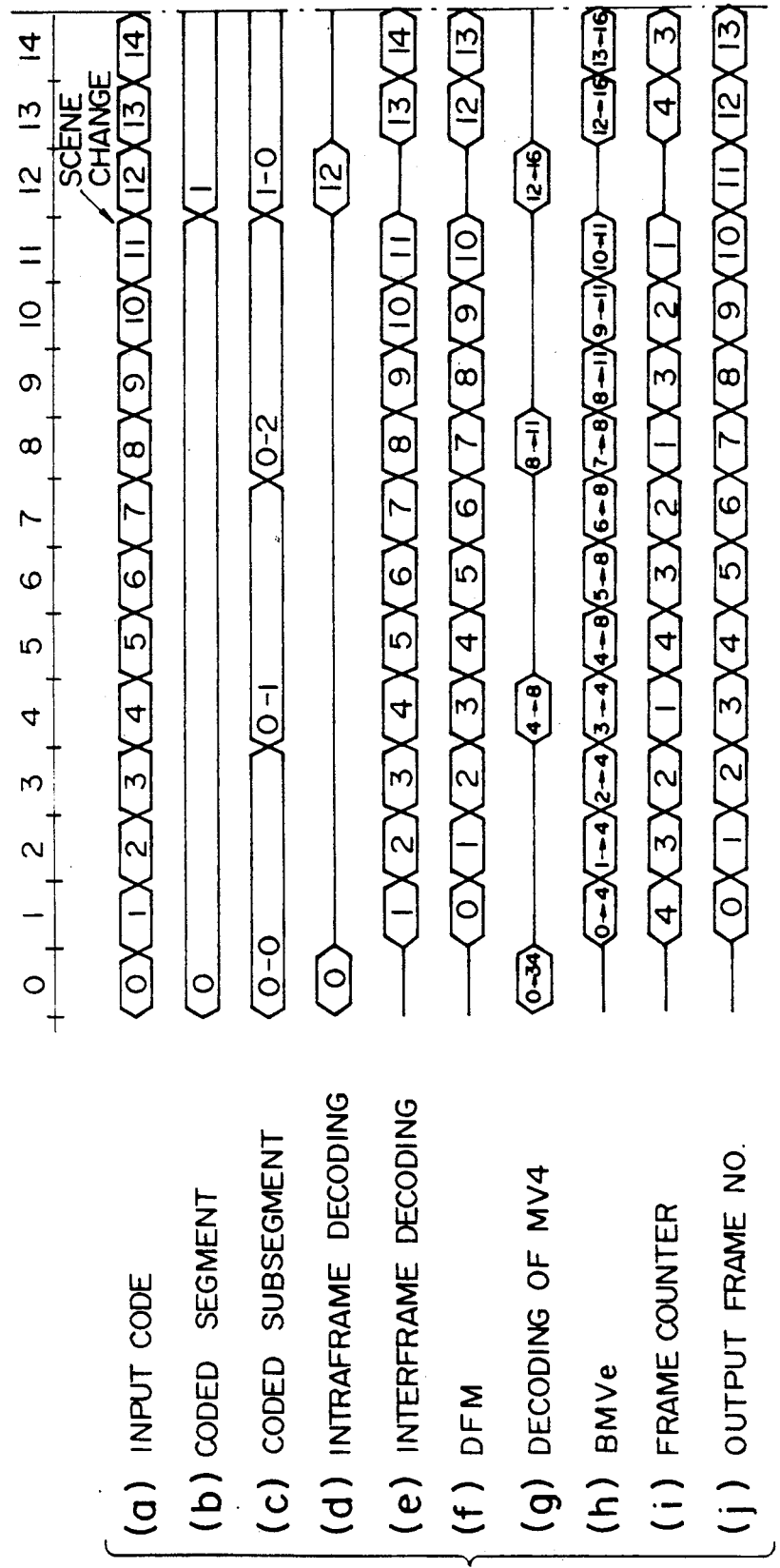
FIG. 7 is a timing chart for explaining the operation of the decoding system of the first embodiment.
Figure 7B:
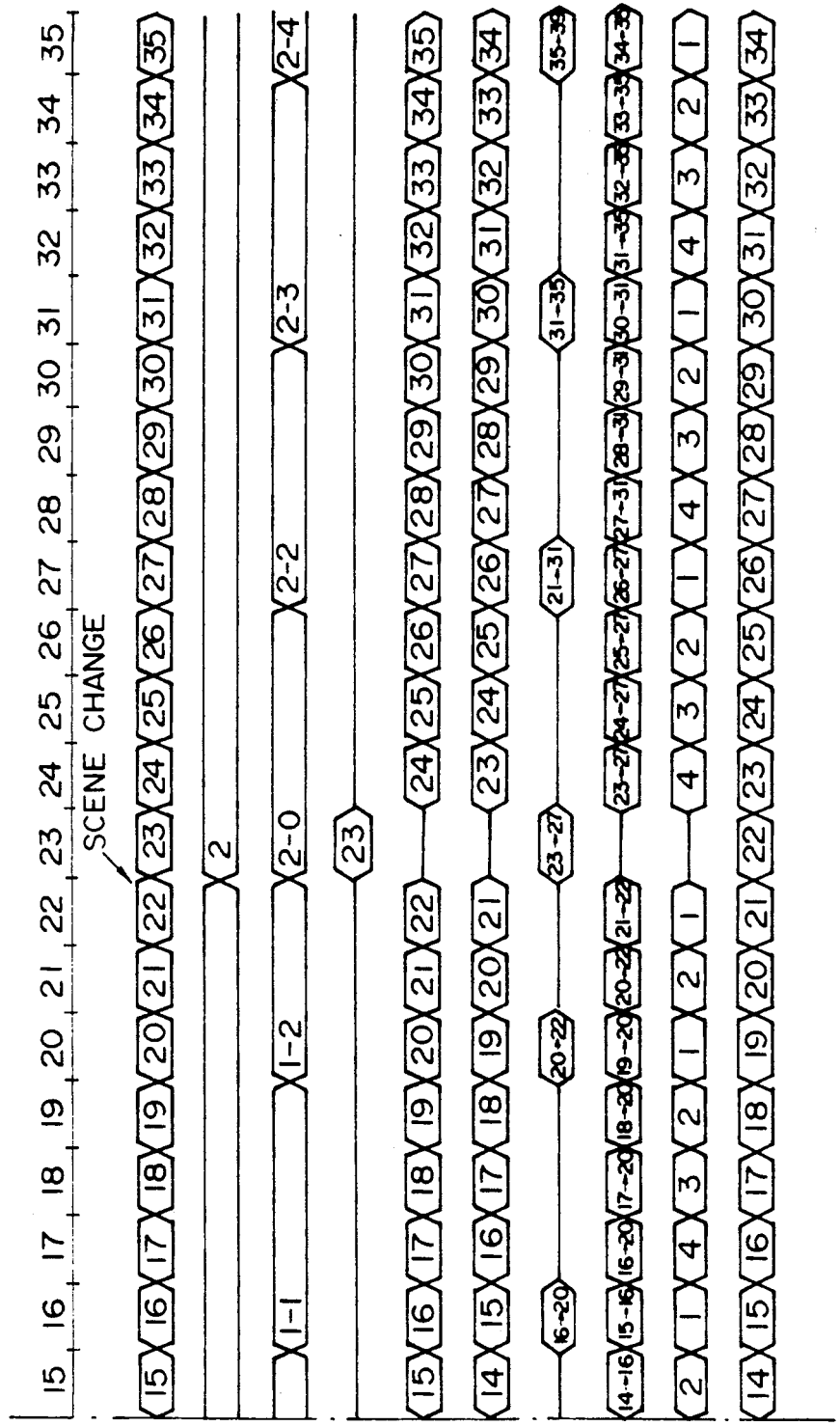

The coding system in the first embodiment is shown in FIG. 4 in a block form, and the timing chart of the coding system is shown in FIG. 5. Furthermore, the decoding system of the first embodiment is shown in FIG. 6 in a block form, and the timing chart of the decoding system is shown in FIG. 7.

Figure 5A:
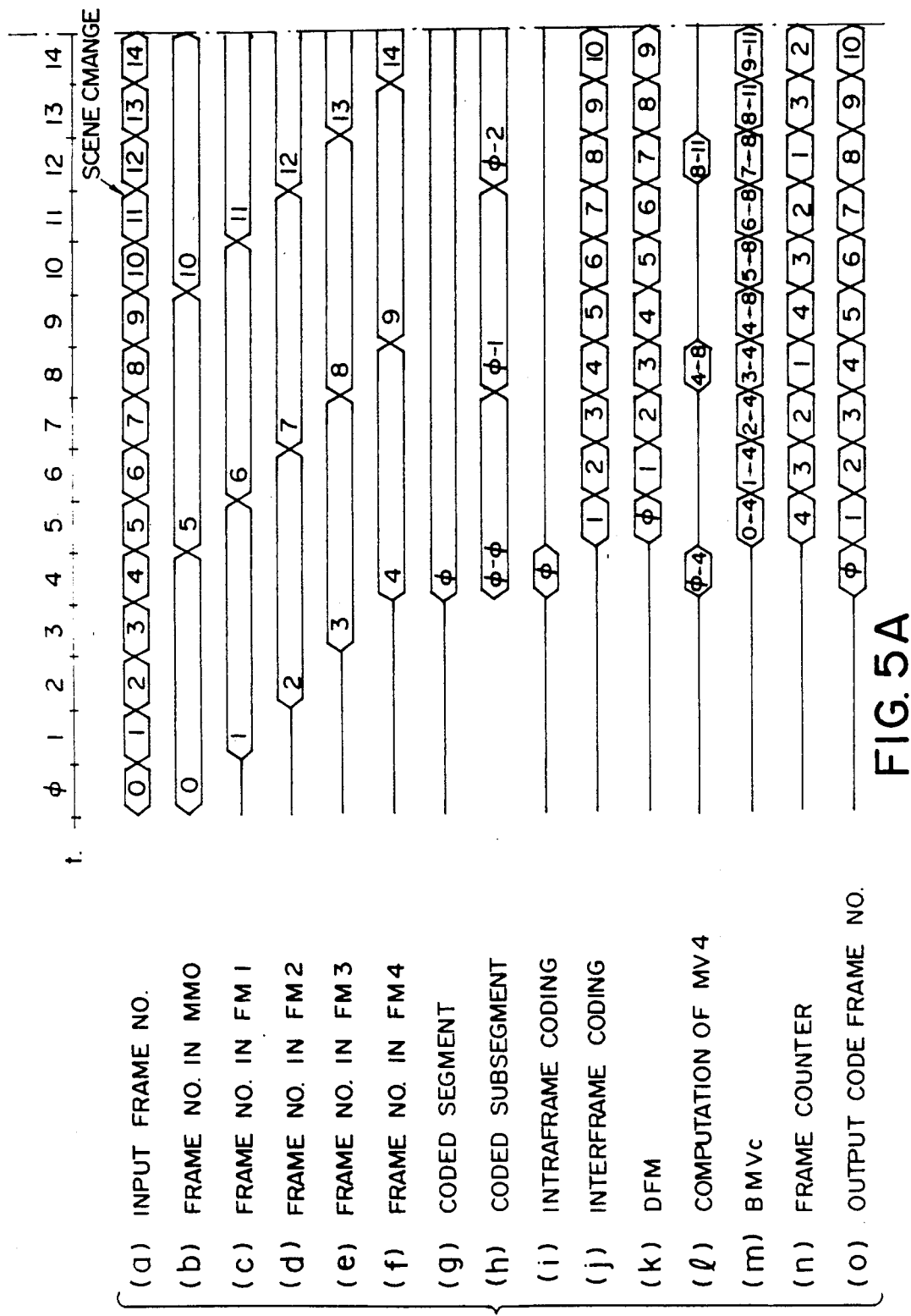
FIG. 5 is a timing chart showing the operation of the coding system of the first embodiment.

It is now assumed in the following description that, as shown in FIGS. 5A(a) and 7A(a), scene changes take place between the eleventh frame and the twelfth frame and between the twenty second frame and the twenty third frame of the input frame, respectively, and that coding is carried out from the frame zero.

a. Regarding the coding system

The coding system will be first described. As described above, scene changes are assumed to take place between the eleventh and twelfth frames (FIG. 5A) and between the twenty-second and twenty third frames (FIG. 5B), respectively. For this reason, the segments coded zero are frames zero to eleven, the first coded segment is the twelfth to twenty-second frames, and the third coded segment is the twenty-third frame and frames subsequent thereto (see FIGS. 5A(g) and 15B(g)).

Furthermore, the 0-0-th coded subsegment is the 0-th to third frames, the 0-1-th coded subsegment is the fourth to seventh frames, and the 0-2-th coded subsegment is the eighth to eleventh frames. Furthermore, the 1-0-th coded subsegment is the twelfth to fifteenth frames, the 1-1-th coded subsegment is the sixteenth to nineteenth frames, and the 1-2-th coded subsegment is the twentieth to twenty-second frames. In addition, the 2-0-th coded subsegment is the twenty-third to twenty-sixth frames, and the 2-1-th coded subsegment is the twenty-seventh to thirtieth frames (see FIG. 5B(h)).

Figure 5B:
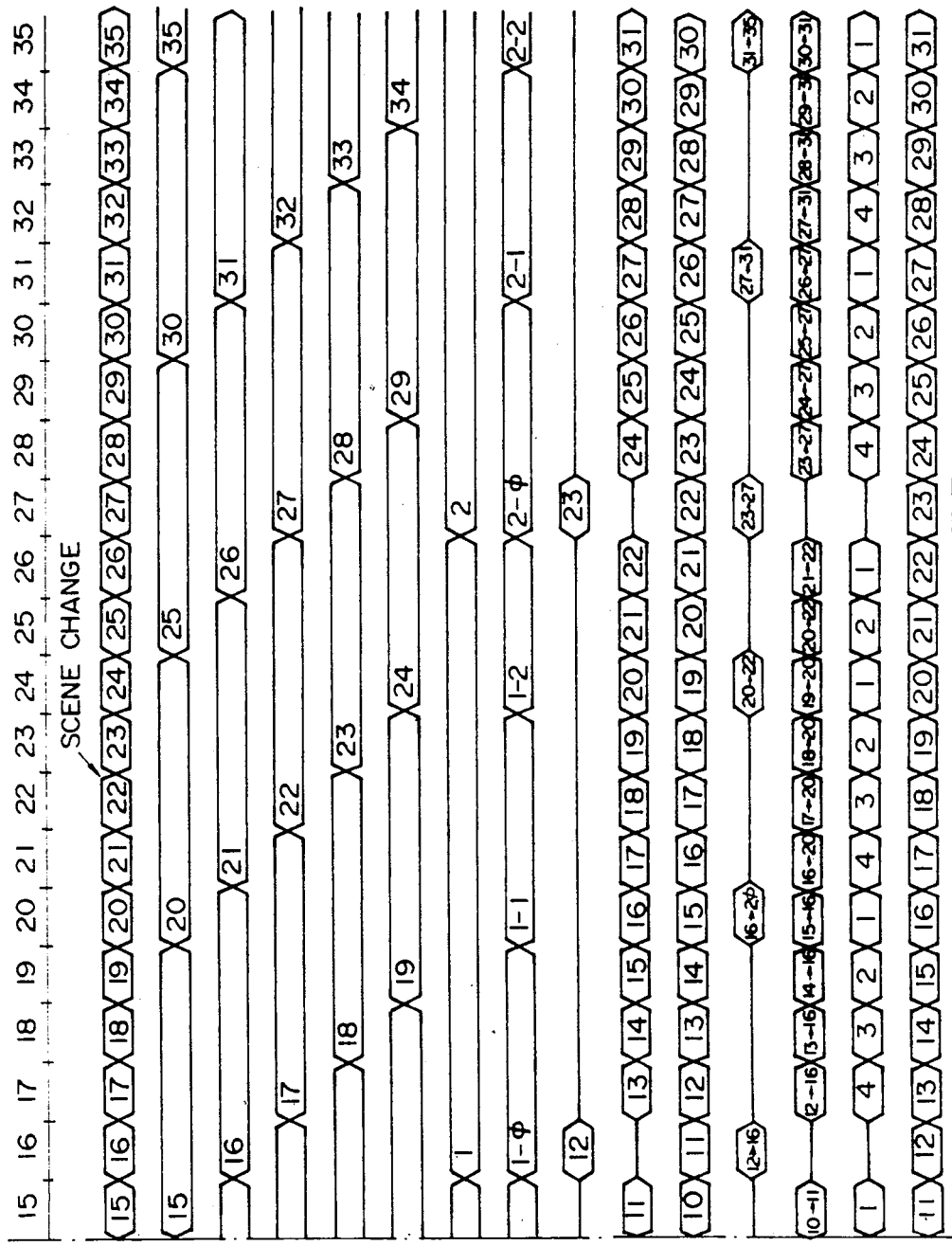

Pictures of the 0-th frame to the fourth frame are delivered in sequence through selectors (hereinafter abbreviated as a SEL0) 30 to frame memories (abbreviated as FM0 to FM4) 31 to 35 during t=0 to 4 in FIGS. 5A and 5B, respectively (see FIGS. 5A(b) and 5B(b)-(f)). At a scene change encoder (hereinafter abbreviated as SCNG-ENC) 36, judgment is made as to whether or not there is a scene change during that period. Since there is no scene change in this case, a code indicative of no scene change is delivered to multiplexer (hereinafter abbreviated as a SAF) 37.

As described above, since coding from the 0-th frame is carried out, an intraframe coding is implemented to the 0-th frame at an intraframe encoder (hereinafter abbreviated as ENC-INT) 38 (see FIG. 5A(i)). A coded output from the ENC-INT 38 is delivered to a code buffer (hereinafter abbreviated as BUF0) 40 through a fourth selector (hereinafter abbreviated as SEL4) 39.

The coded output is also delivered to an intraframe decoder (hereinafter abbreviated as DEC-INT) 41, at which an intraframe decoding is carried out. The decoded picture is delivered to a decoded picture frame memory (hereinafter abbreviated as DFM) 43 through a selector (hereinafter abbreviated as SEL3) 42. By the above-described processing, the intraframe decoding of the 0-th frame is completed. At times subsequent thereto, the fifth frame is inputted through the SFL0 30 to the FM0 31 at time t=5 in FIGS. 5A and 5B (see FIGS. 5A(b) and 15B(b).

Because no scene change exists between the 0-th and the fourth frames, the 0-th frame and the fourth frame are then delivered to a movement vector detector (hereinafter abbreviated as MC4) 45 through a selector (hereinafter abbreviated as SEL1) 44. Then, during t=4 in FIG. 4, detection of the movement vector between four frames (hereinafter abbreviated as MV4) is made (see FIG. 5A(h)). This MV4 is delivered to a movement vector encoder (hereinafter abbreviated as ENC-MVe) 46 and is coded thereat, and is also delivered to a difference movement vector buffer (hereinafter abbreviated as BMVe) 47, at which initialization of the difference movement vector (MVe) is carried out. By the above-described processing, detection of the movement vector MV4 between four frames and the initialization of the difference movement vector are completed.

Then, the first frame is read out from the frame memory FM1 through a second selector (hereinafter abbreviated as SEL2), and a decoded picture of the 0-th frame is read out from the DFM 43. They are both delivered to a movement compensation circuit (hereinafter abbreviated as MC0) 49. Detection of a movement vector (hereinafter abbreviated as MV0) is made at the MC0 49. The MV0 thus detected is delivered to a vector judgment circuit (hereinafter abbreviated as a SEL-MV) 50. Furthermore, a difference movement vector (hereinafter abbreviated as MVe) corresponding to the MV0 is inputted to a division/subtraction circuit (hereinafter abbreviated as CAL-MVei) 51.

In this case, since no scene change is not detected, "4" is delivered, to the CAL-MVei 51, from a remaining frame counter (hereinafter abbreviated as FMCNT) 52 (see FIGS. 5A($n$) and 5B($n$)) for counting remaining frames of which the content is set to "4". Then, a predictive movement vector (MVei=MVe/4) is delivered from the CAL-MVei 51 to a movement vector selection circuit (hereinafter abbreviated as SEL-MV). For this reason, a predictive movement vector (hereinafter abbreviated as MVei) has a resolution of $\frac{1}{4}$ pixels.

Figure 8:
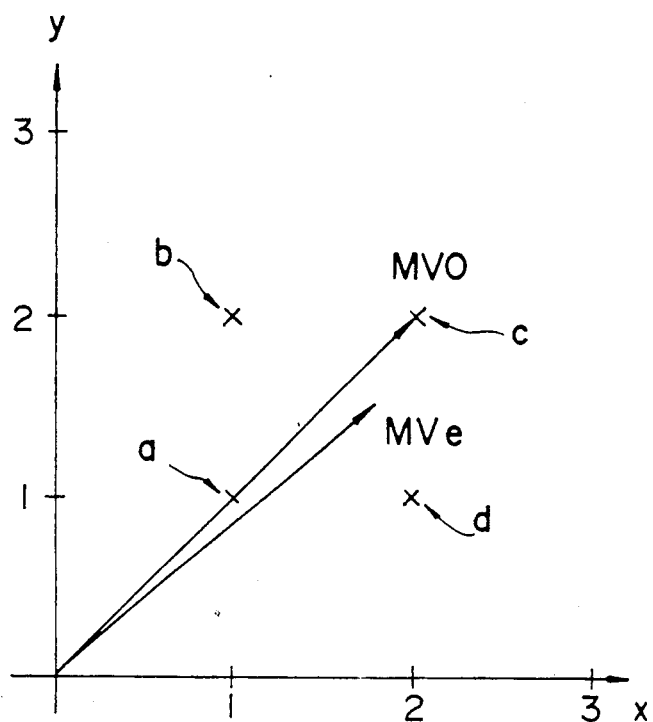
FIGS. 8(a) and 8(b) are characteristic diagrams for explaining the operation of a movement vector selection circuit in the system of the first embodiment, respectively.
Figure 8:
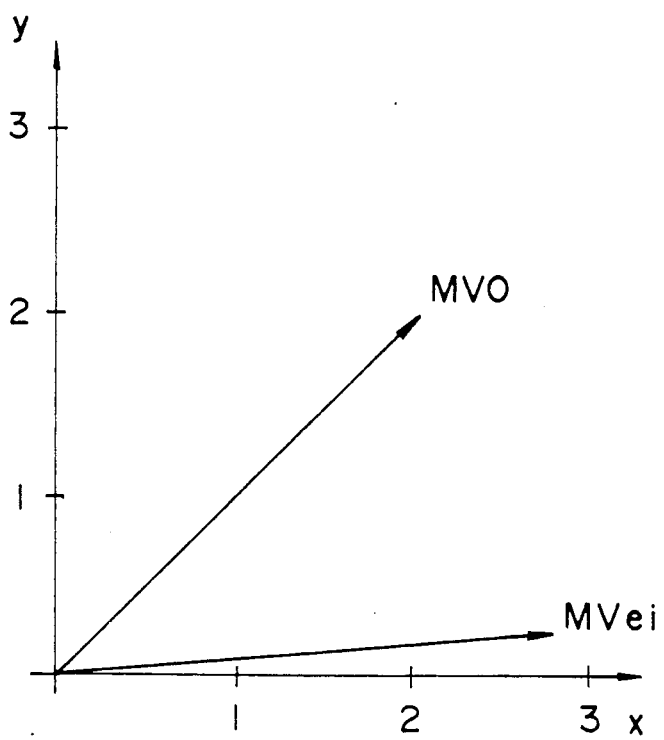

In the SEL-MV 50, where the predictive movement vector (MVei) exists in the vicinity of the movement vector (MV0) as shown in FIG. 8($a$), MVei is selected as the movement vector (MV) between the 0-th and first frames. On the other hand, where no movement vector (MV0) exists in the vicinity thereof as shown in FIG. 8($b$), the movement vector (MV0) is selected as the movement vector (MV) between the 0-th and first frames. This movement vector (MV) is delivered to the CAL-MVei 51. Thus, a vector obtained by subtracting the movement vector (MV) from the difference movement vector (MVe) is inputted as a difference movement vector to the BMVe 47.

Furthermore, the movement vector (MV) is delivered to a still picture judgment circuit (hereinafter abbreviated to MVCK which is not shown) and is used for determining whether or not it is a still picture. Furthermore, the movement vector (MV) is coded by a movement vector encoder (hereinafter abbreviated as ENC-MV) 53, and is then delivered to the SAF 37.

The movement vector (MV) is also delivered to the MC0 49. When the element of the movement vector (MV) is an integer, the MC0 49 outputs a pixel indicated by the movement vector (MV) in the DFM 43. In contrast, when the element of the movement vector (MV) is not an integer, the MC0 49 outputs a value predicted from pixels (a, b, c, d in FIG. 8($a$)) in the vicinity of the coordinate indicated by the movement vector (MV) in the DFM 43. A difference between the pixel value and a pixel having the same address of a current frame selected by the SEL2 48 is coded at a difference encoder (hereinafter abbreviated as an ENC-DIF) 54.

Then, the code indicative of difference is delivered to multiplexer (hereinafter abbreviated as a SAF) and is decoded at a difference decoder (hereinafter abbreviated as DEC-DIF) 55. A decoded picture is formed by the sum of the code indicative of a difference and an output from the MC0 49 and is delayed at a one-frame delay circuit (hereinafter abbreviated as PD) 56. Then, it is delivered to DFM 43 through the SEL3 42.

Figure 25:
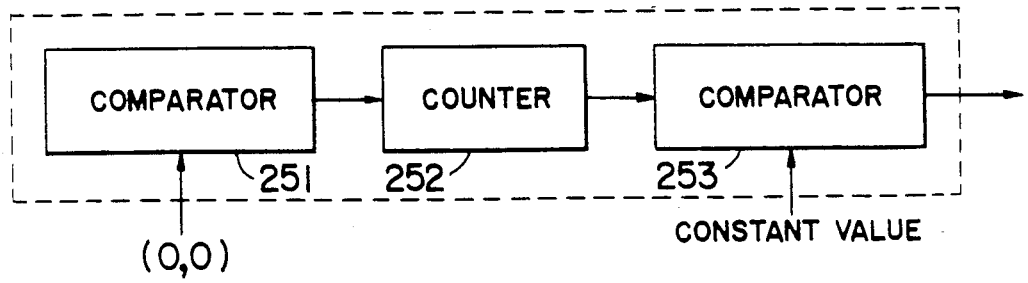
FIG. 25 is a block diagram showing a still picture judgment circuit according to each embodiment of the present invention.

After the multiplexer (SAF) 37 multiplexes four kinds of codes delivered, it delivers them through the SFL4 39 to the BUF0 40. When these codes are judged as a moving picture by the still picture judgment circuit such as shown in FIG. 25, the BUF0 40 adds a code indicative of the moving picture to the multiplexed code to deliver it through a fifth selector (hereinafter abbreviated as SEL5) 57 to a code buffer (hereinafter abbreviated as BUF1) 58.

On the other hand, when those codes are judged as a still picture as a result of the still picture judgment, the BUF0 40 adds a code indicative of the still picture to the multiplexed code to conduct high precision coding at the ENC-INT 38 to output those codes through the SEL5 57 to the BUF1 58. Thus, the BUF1 58 outputs codes stored therein to the transmission path in dependency upon the state of the transmission path.

By the above-described processing, the movement compensation interframe predictive coding of the frame 1 is completed at the time t=5 in FIG. 5A. As a result, the content of the remaining counter becomes equal to 3 (see FIG. 5A($n$)). At t=6, the sixth frame is inputted through the SEL0 30 to the FM1 32 (see FIG. 5A($c$)).

At t=6, the movement compensation interframe predictive coding of the second frame is carried out by processing similar to the above between the decoded picture of the first frame in the DFM 43 and the second frame in the FM2 33. Furthermore, at t=7, the movement compensation interframe predictive coding of the third frame is carried out by the processing similar to the above At t=8, the movement compensation interframe predictive coding of the fourth frame is carried out by the processing similar to the above.

At t=8, the fourth frame in the FM4 35 and the eighth frame in the FM3 34 are selected at the SEL0 30. Thus, the movement vectors (MV4) of the fourth and eighth frames are determined. At t=9, they are inputted to the EMVe 47. At t=9 to 12 subsequent thereto, the movement compensation interframe predictive coding of the fifth to eighth frames will be similarly carried out.

Furthermore, when a scene change between the eleventh and twelfth frames is detected at the SCNG-ENC 36, that scene change is coded. The coded scene change is outputted to the SAF 37 and the intraframe coding of the twelfth frame after scene change is carried out at t=16. Furthermore, detection of the movement vector between the twelfth and sixteenth frames is made. The compensation interframe predictive coding of the thirteenth to nineteenth frames is carried out in a manner similar to that of the 0-th to eleventh frames.

Furthermore, when a scene change between the twenty-second and twenty-third frames is detected at t=24, the 1-2-th coding subsegment becomes the twentieth to the twenty-second frames. At t=25, the frame counter is set to 2. Then, the movement compensation interframe predictive coding of the twenty-first and twenty-second frames is carried out at t=25 and 26. With respect to the frames subsequent to the twenty-third frame, coding processing is conducted at times subsequent to t=27.

In the above-described embodiment, reference numeral denotes a sixth selector (SFL6).

By the above-described processing, movement compensation interframe predictive coding by the movement vector having a resolution of one pixel or more is carried out.

It should be noted that the intraframe encoder (ENC-INT) 38, the difference encoder (ENC-DIF) 54, the intraframe decoder (DEC-INT) 41, and the difference decoder (DEC-DIF) may be served by a commercially available semiconductor device such as the CL550A JPEG image compression processor made by C-CUBE MICROSYSTEMS which operates in either the compression or the decompression mode according to the Joint Photographic Experts Group (JPEG) proposed international standard.

b. Regarding the decoding system

The decoding system will now be described with reference to FIGS. 6 and 7. In the decoding system, a code from the transmission path is once stored in a buffer for code (hereinafter abbreviated as a BUF) 60. After the code undergoes adjustment of speed, it is outputted. When a code of the still picture is detected at scene change decoder (hereinafter abbreviated as a SCNG-DEC) 61, high precision decoding is carried out at an intraframe decoder (hereinafter abbreviated as DEC-INT) 63.

When a code of the moving picture is detected at the SCNG-DEC 61, a code which has undergone intraframe coding at the coding system is delivered through a selector (hereinafter abbreviated as SEL0) 62 to the DEC-INT 63. Thus, the number of frames in the decoded segment is set at frame counter (hereinafter abbreviated as a FMCNT) 64. A decoded picture provided at the DEC-INT 63 is delivered through a selector (hereinafter abbreviated as SEL1) 65 to a frame memory (hereinafter abbreviated as DEM) 66, and is outputted through a second selector (hereinafter abbreviated as SEL2) 67 to the external.

On the other hand, when no code of scene change is detected, the code from the BUF 60 is divided into a code of a difference movement vector, a code of a movement vector, and a code of a difference at the SEL0 62.

The code of the difference movement vector of the above codes is decoded at a movement vector decoder (hereinafter abbreviated as DEC-MVe) 68, and is then delivered to a difference movement vector buffer (hereinafter abbreviated as BMVe) 69. By an output from the BMVe 69 and an output from the FMCNT 64, a computation of the predictive movement vector (MVei) is carried out at a division/subtraction circuit (hereinafter abbreviated as CAL-MVei) 70. The computed result is delivered to a movement vector selector (hereinafter abbreviated as SEL-MV) 71.

Then, the code of the movement vector is decoded at movement vector decoder (hereinafter abbreviated as a DEC-MV) 72. The decoded movement vector (MVi) is delivered to the SEL-MV 71. At the SEL-MV 71, a vector used in the coding system of the predictive movement vector (MVei) and the movement vector (MVi) is selected as a movement vector (MV). This movement vector (MV) is delivered to the CAL-MVei 70. Furthermore, at CAL-MVei 70, a vector obtained by subtracting the movement vector (MV) from the difference movement vector (MVe) is delivered as a difference movement vector of the next frame to the BMVE 69. The movement vector (MV) is also delivered from the SEL-MV 71 to a movement compensation circuit (hereinafter abbreviated as MC) 73. At the MC 73, by using the decoded picture of the preceding frame in the DFM 66 and the movement vector (MV), a synthesized picture is generated by a means similar to that of the coding system.

Furthermore, the code of the difference is decoded at difference decoder (hereinafter abbreviated as a DEC-DIF) 74, and a decoded picture is formed by the sum of the decoded difference picture and the synthesized picture. This decoded picture is outputted through the SEL2 67, and is also delayed by one frame at a delay circuit (hereinafter abbreviated as FD) 75 and is then inputted to the DFM 66.

As stated above, when any scene change is detected, an intraframe decoding is carried out, and when otherwise, a sequential correction of the difference movement vector is made, whereby a movement compensation interframe predictive decoding is carried out.

Second embodiment

Figure 9:
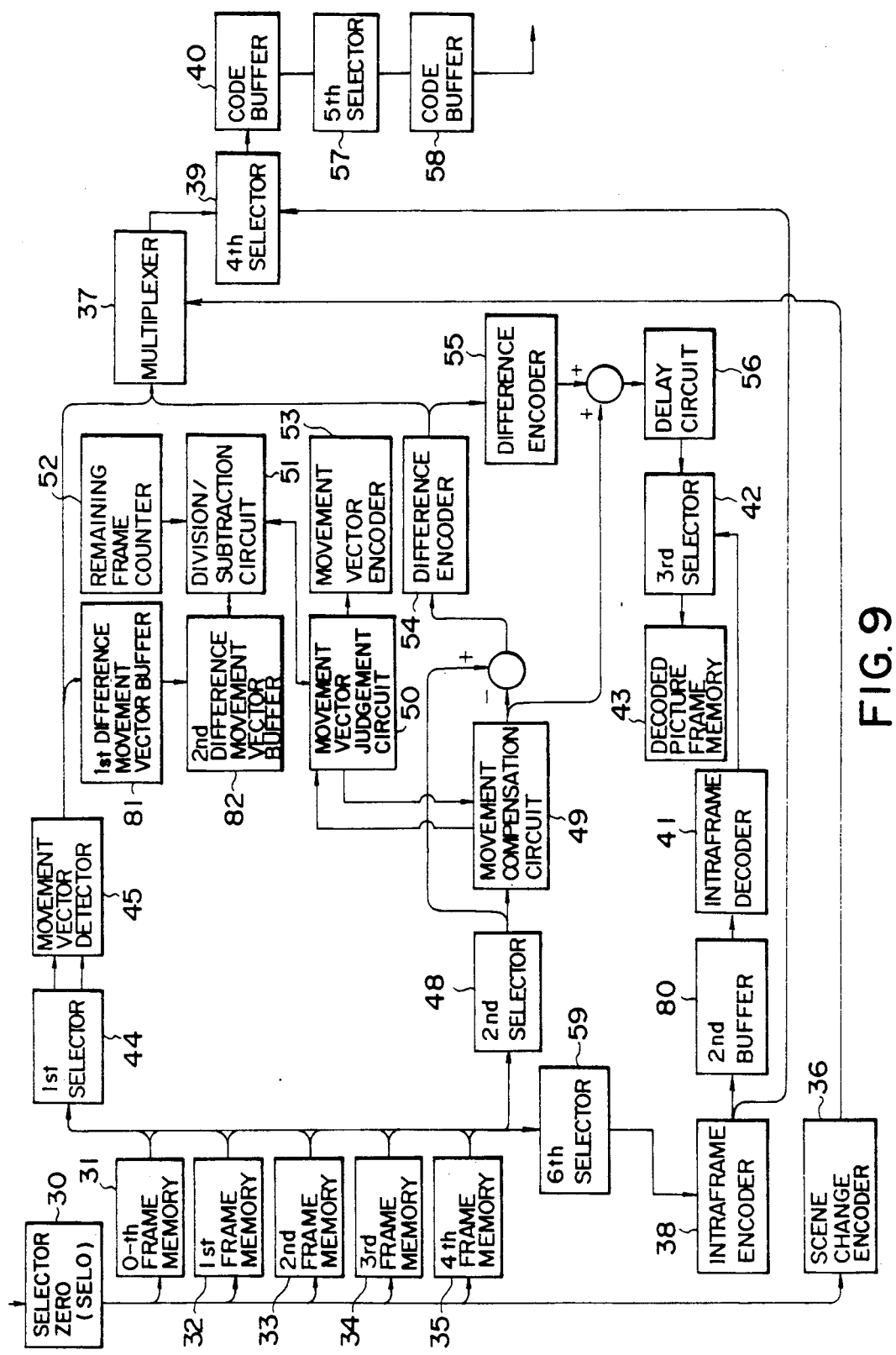
FIG. 9 is a block diagram showing a coding system according to a second embodiment of this invention.
Figure 10A:
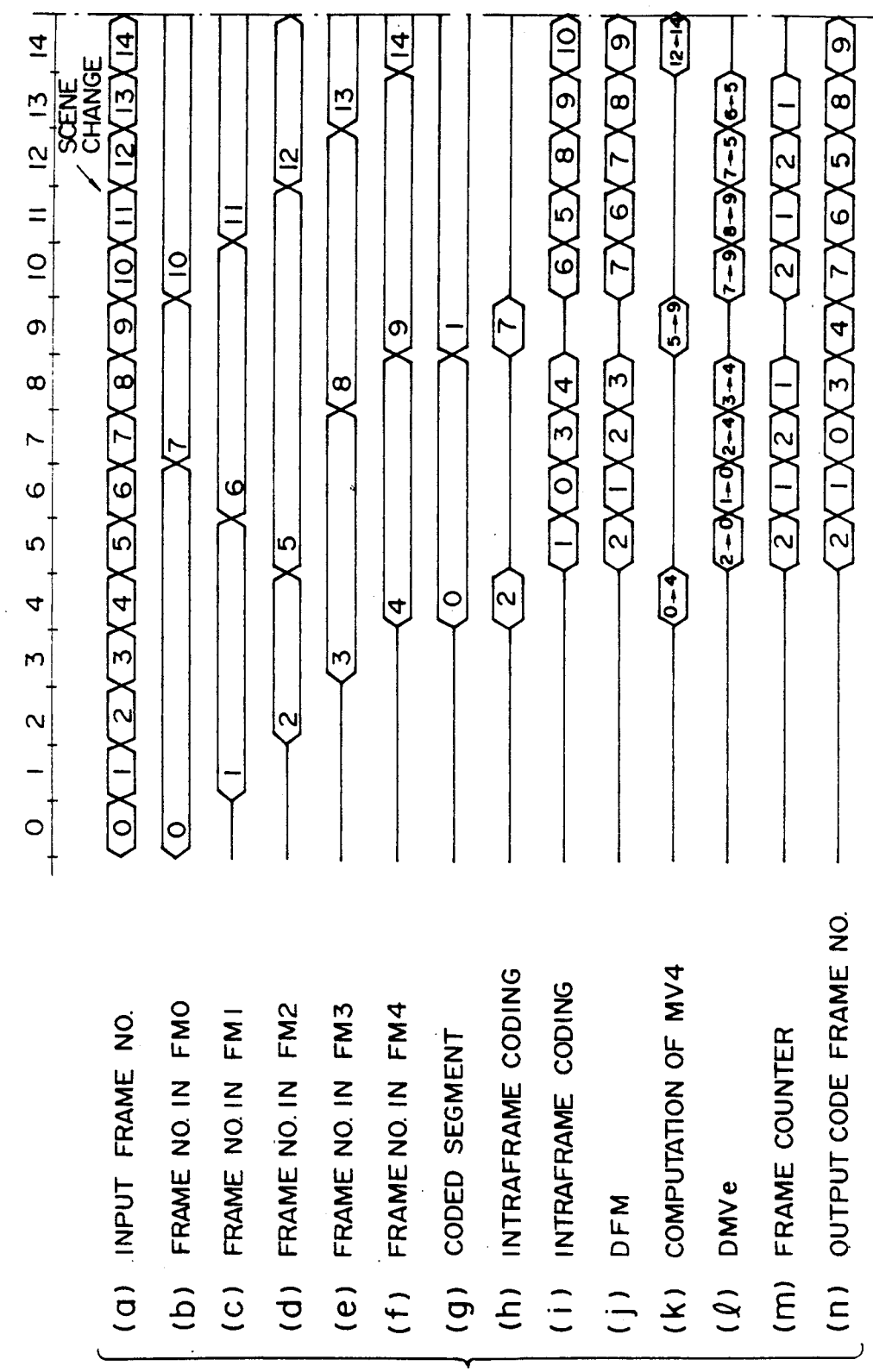
FIG. 10 is a timing chart showing the operation of the coding system of the second embodiment.
Figure 10B:
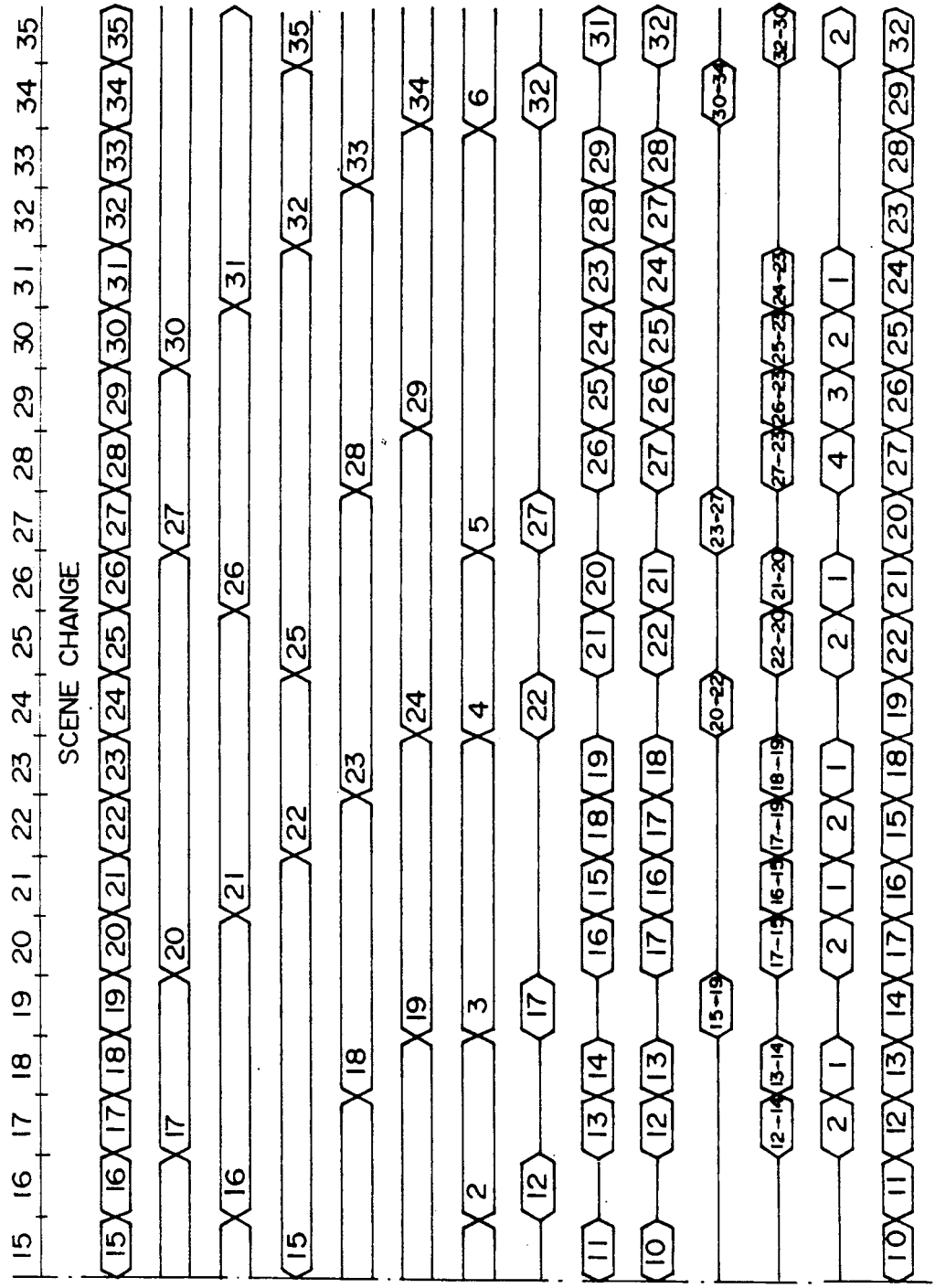
Figure 11:
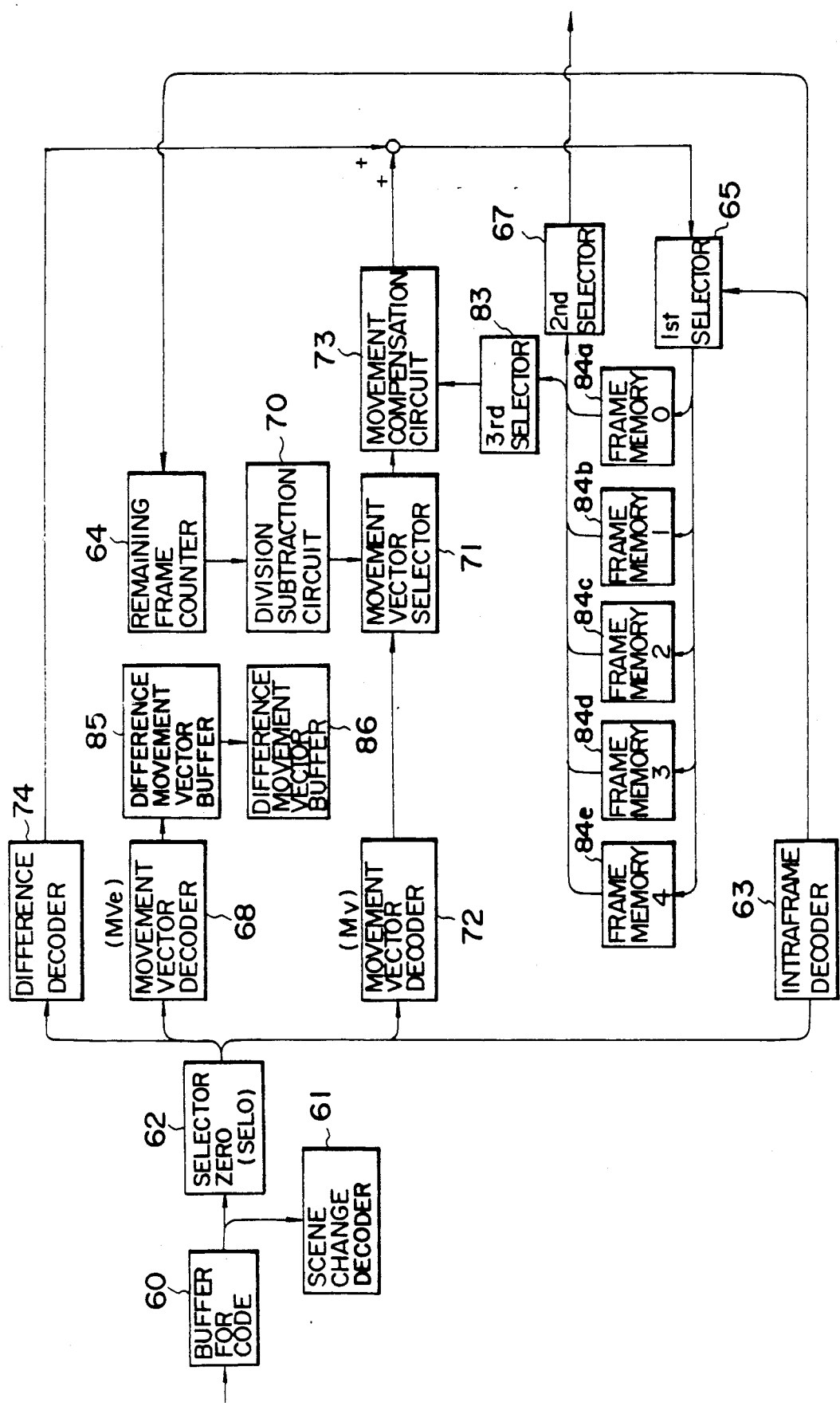
FIG. 11 is a block diagram showing a decoding system according to a second embodiment of this invention.
Figure 12A:
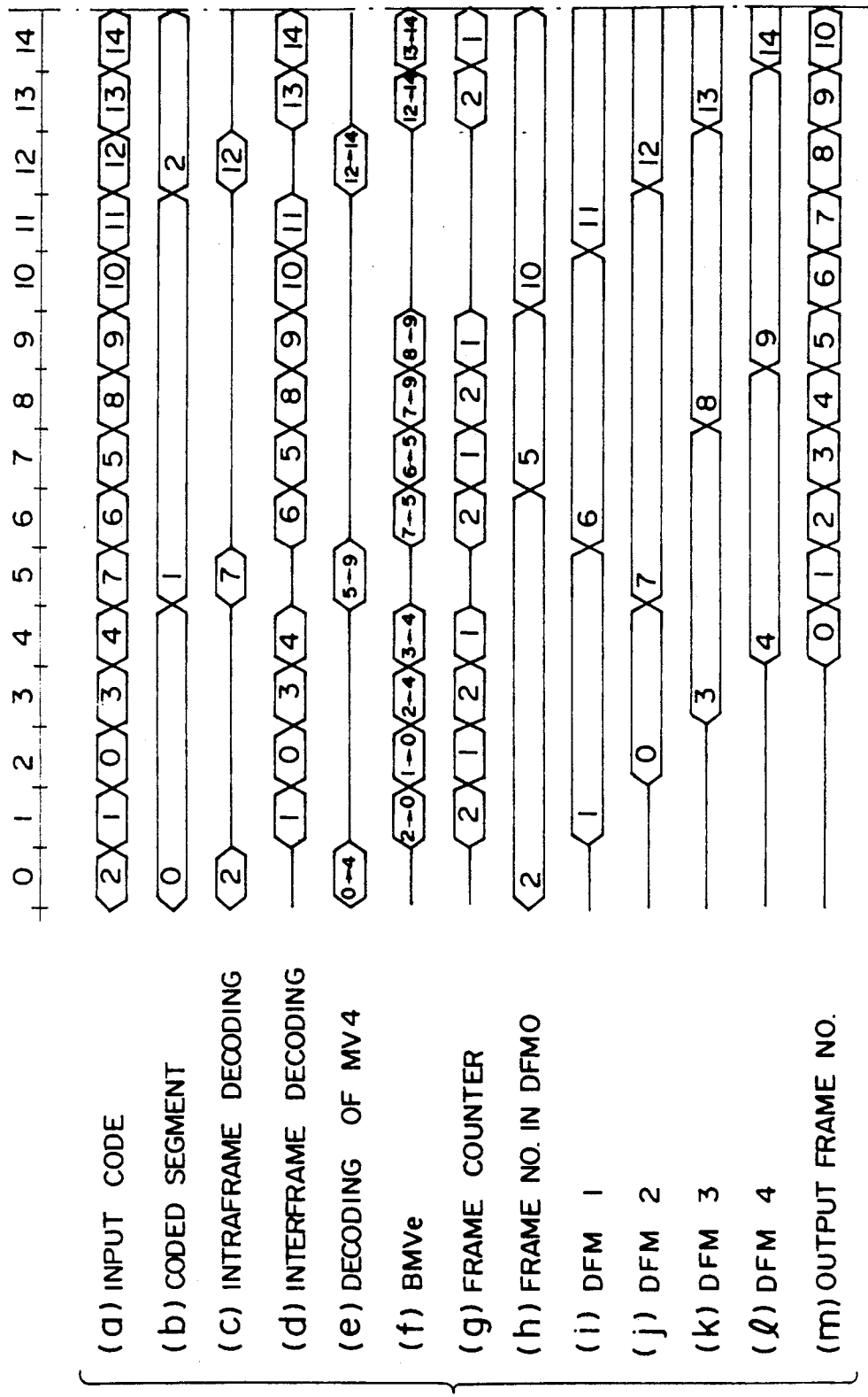
FIG. 12 is a timing chart showing the operation of the decoding system of the second embodiment.
Figure 12B:
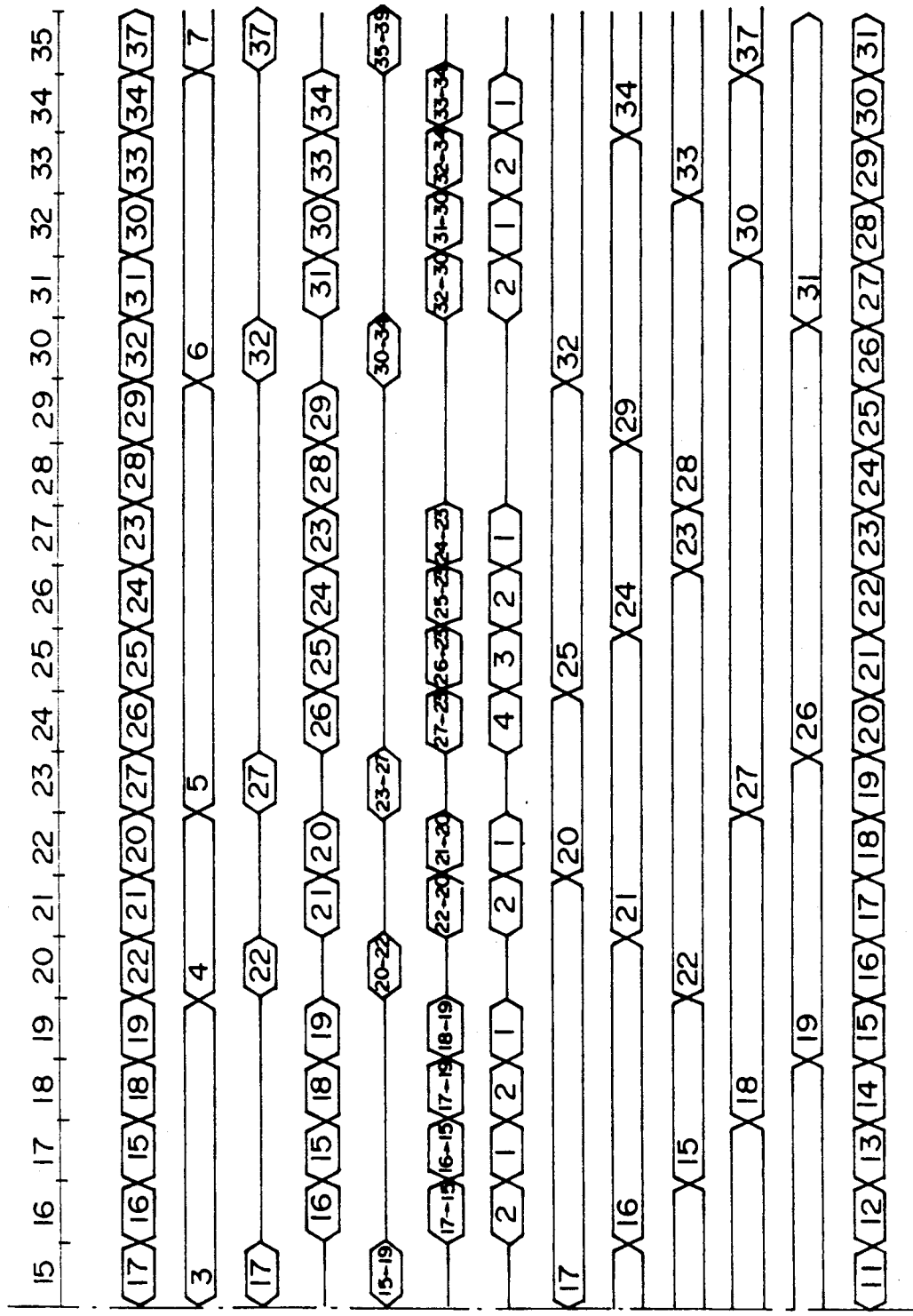

A second embodiment of this invention will now be described with reference to FIGS. 9 to 12. A coding system in the second embodiment is shown in a block form in FIG. 9, and a timing chart of the coding system is shown in FIGS. 10A and 10B. Furthermore, a decoding system in the second embodiment is shown in a block form in FIG. 11, and a timing chart of the decoding system is shown in FIG. 12.

It is now assumed in a manner similar to the above-described first embodiment that a scene change takes place between the eleventh and twelfth frames and between the twenty-second and twenty-third frames, and that coding is carried out from the 0-th frame.

a. Regarding the coding system

The coding system will now be described. In the arrangement of FIG. 9, the same reference numerals as those in FIG. 4 denote equivalent or corresponding components, respectively. During a time period of $t=0$ to 4 in FIGS. 10A and 10B, the 0-th to the fourth frames of the 0-th coded segment are sequentially delivered through the selector (SEL0) 30 in FIG. 9 to the frame memories (FM0 to FM4) 31 to 35 (see FIGS. 10A(a)-(f) and 10B((a)-(f)). At a scene change encoder (SCNG-ENC) 36, whether or not a scene change occurred during that period is determined. Since there is no scene change during this time period as described above, a code indicative of no scene change is delivered to a multiplexer (SAF) 37.

Then, intraframe coding is implemented to the second frame at an intraframe coding circuit (ENC-INT) 38. A coded output from the ENC-INT 38 is delivered to a code buffer 40 (BUF0) 40 through a fourth selector (SEL4) 39.

The coded output is also delivered to a buffer for intraframe code (hereinafter abbreviated as BUF2) 80. By an output code from the BUF2 80, an intraframe decoding is carried out at DEC-INT 41. The decoded picture is delivered to DFM 43 through a selector (SEL3) 42. By the above-described processing, the intraframe decoding of the second frame is completed. At times subsequent thereto, the fifth frame is inputted through the SFL0 30 to the FM2 33 at time $t=5$ (see FIGS. 10A(d) and 10B(d)).

Because no scene change exists between the 0-th and the fourth frames, the 0-th frame and the fourth frame are then delivered to MC4 45 through a selector (SEL1) 44. Then, during $t=4$, detection of movement vector between four frames is made (see FIGS. 10A(k)). This MV4 is delivered to the (ENC-MVe) 46 and is coded thereat, and is also delivered to a first difference movement vector buffer (hereinafter abbreviated as BMVe0) 81.

Then, the first frame is read out from the frame memory FM1 32 through a selector (SEL2) 48, and a decoded picture of the second frame is read out from the DFM 43. They are both delivered to the MC0 49. Detection of the movement vector (MV1) is made at the MC0 49. The MV1 thus detected is delivered to the SEL-MV 50.

Then, by using the movement vector (MV4) from the BMVe0 81, a second difference movement vector buffer 1 (BMVe1) 82 is initialized so as to have a difference movement vector (MVe). Furthermore, a difference movement vector (MVe) corresponding to the (MV1) is inputted to the CAL-MVei 51. In this case, since no scene change is detected, "2" is delivered to the CAL-MVei 51, from the FCNT 52 for counting the remaining frames for which the content is set to "2". Then, a predictive movement vector (MVei=MVe/2) is delivered from the CAL-MVei 51 to the SEL-MV 50.

In the SEL-MV 50, where the predictive movement vector (MVei) exists in the vicinity of the movement vector (MV0), MVei is selected as the movement vector (MV) between the 0-th and first frames. On the other hand, where no predictive movement vector (MVei) exists in the vicinity of the movement vector (MV0), the movement vector (MV0) is selected as the movement vector (MV) between the second and first frames.

This movement vector (MV) thus selected is delivered to the CAL-MVei 51. Thus, a vector obtained by subtracting the movement vector (MV) from the difference movement vector (MVe) at the CAL-MVei 51 is determined as a difference movement vector and the vector thus obtained is inputted to the BMVe1 82. Furthermore, the movement vector (MV) is delivered to a still picture judgment circuit (MVCK, not shown) and is used to determine whether or not it is a still picture.

Furthermore, the movement vector (MV) is coded by a movement vector encoder (ENC-MV) 53, and is then delivered to the SAF 37. The movement vector (MV) is also delivered to the MC 49. When the element of the movement vector (MV) is an integer, the MC0 49 outputs a pixel indicated by the movement vector (MV) in the DFM 43. In contrast, when the element of the movement vector (MV) is not an integer, the MC0 49 outputs a value predicted from pixels in the vicinity of the coordinate indicated by the movement vector (MV) in the DFM 43. A difference between the pixel value thus obtained and a corresponding pixel through the SEL2 48 is coded at a difference encoder (ENC-DIF) 54.

Then, a code indicative of the difference is delivered to the SAF and is decoded at the DEC-DIF 54. A decoded picture is formed by the sum of the code indicative of a difference and an output from the MC0 49 and is delayed at the FD 56. It is delivered to the DFM 43 through the SEL3 42.

After the SAF 37 multiplexes four kinds of codes delivered, it delivers them through the SFL4 39 to the BUF0 40. When these codes are judged as a moving picture as a result of the still picture judgment at the MVCK, the BUF0 adds a code indicative of the moving picture to the multiplexed code to deliver through a selector (SEL5) 57 to the code buffer (BUF1) 58. On the other hand, when those codes are judged as a still picture as a result of the still picture judgment, the BUF0 40 adds a code indicative of the still picture to the multiplexed code to conduct high-precision coding at the ENC-INT 38 to output those codes through the SEL5 57 to the BUF1 58. Thus, the BUF1 58 outputs codes stored therein to the transmission path in dependency upon the state of the transmission path.

By the above-described processing, the movement compensation interframe predictive coding of the frame 1 is completed at t=5 in FIG. 10. As a result, the content of the remaining counter becomes equal to 1. At t=6, the sixth frame is inputted through the SEL0 30 to the FM1 32. At t=6, the movement compensation interframe predictive coding of the 0-th frame is carried out by processing similar to the above between the decoded picture of the first frame in the DFM 43 and the 0-th frame of the FM0 31.

Then, at t=7, the movement vector (MV4/2) is delivered from the BMVe0 81 to the BMVe1 82. Thus, the difference movement vectors of the second to fifth frames are initialized. A decoded picture of the second frame obtained by decoding a code outputted from the BUF2 80 at the DEC-INT 41 is delivered through the SEL3 42. Thus, the movement compensation interframe predictive coding of the third frame is carried out by the processing similar to the above. At t=8, the movement compensation interframe predictive coding of the fourth frame is similarly carried out. By the above-described processing, coding of the 0-th to fourth frames is completed by the above-described processing.

Then, at t=9 in FIG. 10, the seventh intraframe coding in the FM0 31 is similarly carried out. The fifth frame in the FM2 33 and the ninth frame in the FM4 35 are selected at the SEL0 30. Thus, movement vectors (MV5) of the fifth and ninth frames are determined. Furthermore, at t=10 to 13, the movement compensation interframe predictive coding of the sixth, fifth, eighth and ninth frames is similarly carried out.

At the tenth to fourteenth frames of the next coded segment, at t=13, a scene change between the eleventh and twelfth frames is detected at the SCNG-ENC 36. For this reason, at t=14, by using the decoded picture of the ninth frame, the compensation interframe predictive coding of the tenth frame is carried out by the method similar to that in the prior art. Furthermore, at t=15, by using the decoded picture of the tenth frame, movement compensation interframe predictive coding of the eleventh frame is carried out by a method similar to that in the prior art. Accordingly, each resolution of the movement vectors in the tenth and eleventh frames becomes lower. However, since such a coding is conducted immediately before scene change, one cannot recognize the visible degradation.

With respect to the remaining twelfth, thirteenth and fourteenth frames, the intraframe coding of the twelfth frame is carried out at t=16, and the interframe coding of the thirteenth and fourteenth frames is carried out at t=17, 18 using movement vectors of the twelfth to fourteenth frames. With respect to the fifteenth to nineteenth frames, coding is carried out at t=19 to 23 in a manner similar to that of the 0-th to fourth frames.

At the twentieth and twenty-fourth frames of the next coded segment, at t=24, a scene change between the twenty-second and twenty-third frames is detected at SCNG-ENC 36. For this reason, at t=24, movement vectors between the twentieth to twenty-second frames are determined, and intraframe coding of the twenty-second frame is carried out. Then, at t=25, 26, the movement interframe predictive coding of the twenty-first and twenty-second frames is conducted.

At t=27, movement vectors between the twenty-third to twenty-seventh frames are determined, and intraframe coding of the twenty-seventh frame is carried out. At t=28 to 31, the movement compensation interframe predictive coding of the twenty-sixth to twenty-third frames is conducted.

At t=32, using a decoded picture of the twenty seventh frame, the movement compensation interframe predictive coding of the twenty-eighth frame is carried out by a method similar to that of the prior art. Finally, at t=33, using a decoded picture of the twenty-eighth frame, the movement compensation interframe predictive coding of the twenty-ninth frame is carried out by a method similar to that of the prior art.

By the above-described processing, the hybrid coding of the intraframe coding and the movement compensation interframe predictive coding completed by five frames which can cope with any scene change is carried out.

b. Regarding the decoding system

The decoding system of the second embodiment will now be described with reference to FIGS. 11 and 12. In the decoding system, a code from the transmission path is once stored in the BUF 60. After the code undergoes adjustment of speed, it is outputted. When a code of the still picture is detected at the SCNG-DEC 61, high-precision decoding is carried out at the DEC-INT 63.

Furthermore, when a code of the moving picture is detected at the SCNG-DEC 61, subsequent codes are delivered for every code through the SEL0 62, to the DEC-INT 63, the DEC-MV 72, the DEC-MVe 68, and DEC-DIF 74, respectively.

At t=0 in FIG. 12, the code of the second frame is subjected to intraframe coding at the DEC-INT 63. This decoded picture is delivered through SEL1 65 to the DFM0 84a. Then, movement vectors between the 0-th to the fourth frames are decoded at the DEC-MVe 68. The decoded movement vectors are delivered to a difference movement vector buffer 0 (hereinafter abbreviated as BMVe0) 85.

At t=1, the frame counter is set to "2". Thus, movement vectors (MVei = −MVe/2) between the second to 0-th frames are delivered from the BMVeO 85 to a difference movement vector buffer 1 (hereinafter abbreviated as BMVe1) 86. Furthermore, the movement vector (MVi) between the second and first frames is decoded at the DEC-MV 72.

At the SEL-MV 71, a vector used in the coding system (see FIG. 9) of the movement vectors (MVei) and (MVi) is selected as the movement vector (MV). This movement vector (MV) is delivered to the CAL-MVei 70. This CAL-MVei 70 delivers, to the BMVe1 86, as a difference movement vector (MVe) of the next frame, a vector obtained by subtracting the movement vector (MV) from the difference movement vector (MVe).

The movement vector (MV) is also delivered from the SEL-MV 71 to the MC 73. At the MC 73, a synthesized picture of the first frame is formed. At the DEC-DIF 74, the first frame is decoded by the sum of the decoded difference picture and the synthesized picture. The decoded picture is delivered to a decode picture frame memory 1 (DFM1) 84b through the SEL1 65.

At t=2, the FMCNT 64 is set to "1". By using a decoded picture of the first frame in the DFM1 84b, the 0-th frame is similarly decoded.

At t=3, the frame counter (FMCNT) is set to "2". By using the decoded picture of the second frame in the DFM0 84a, movement vectors (MVei=MVe/2) between the second to fourth frames are delivered from the BMVe0 85 to the BMVe1 86. Thus, the third frame is similarly decoded.

At t=4, the frame counter (FMCNT) 64 is set to "1". By using the decoded picture of the third frame in the DFM3 84d, the fourth frame is similarly decoded. By the above-described processing, decoding of the 0-th coded segment is completed.

Similarly, decoding of the fifth to ninth frames in the first coded segment is carried out at t=5 to 9. Decoding of the remaining tenth and eleventh frames using the movement vector (MVi) is carried out at t=10 and 11. Thus, decoding of the first coded segment is completed.

Furthermore, decoding of the second coded segment is made at t=12 to 14, decoding of the third coded segment is made at t=15 to 19, and decoding of the fourth coded segment is made at t=20 to 22.

Third embodiment

Figure 13:
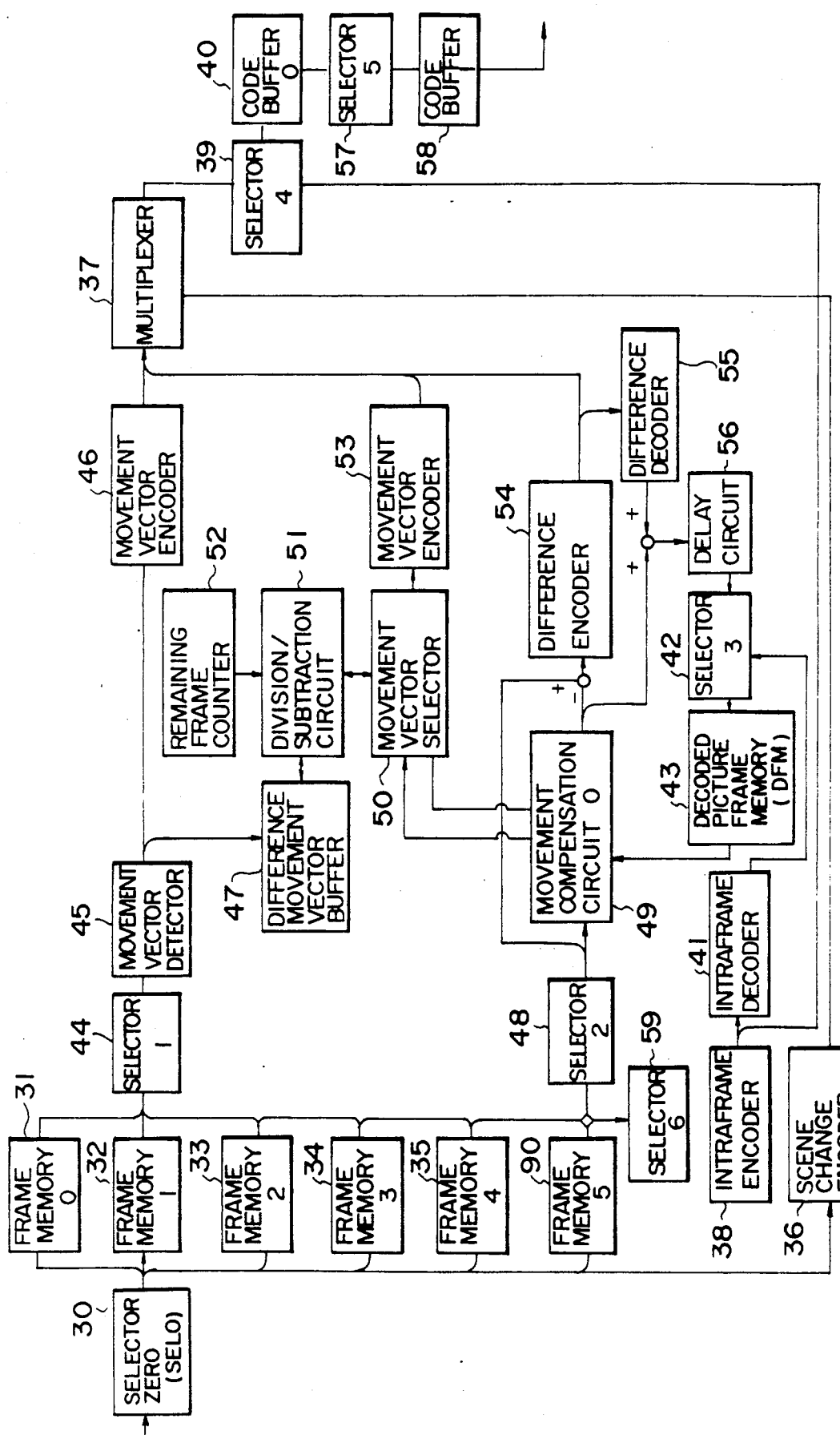
FIG. 13 is a block diagram showing a coding system according to a third embodiment of this invention.
Figure 14A:
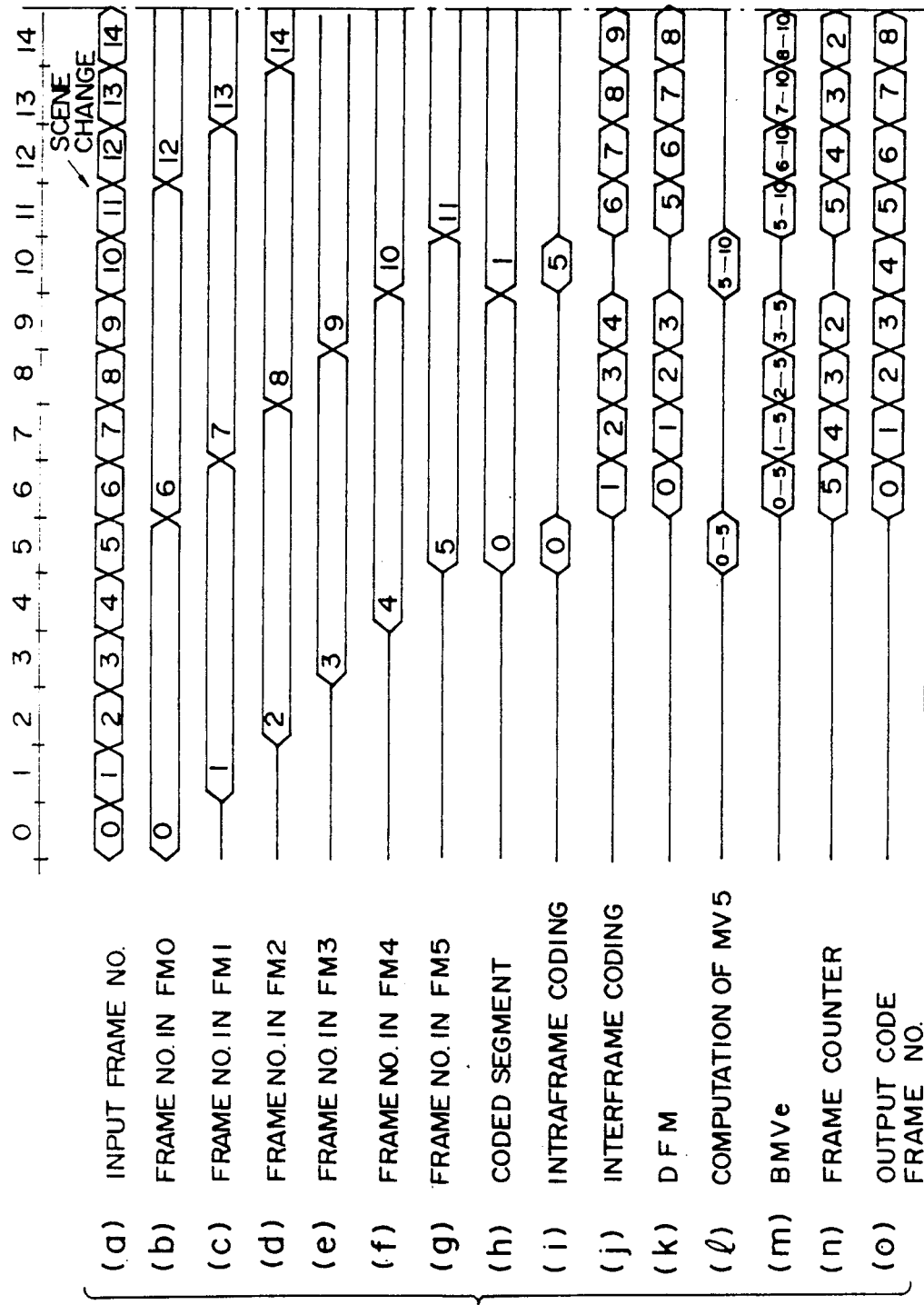
FIG. 14 is a timing chart showing the operation of the coding system of the third embodiment.
Figure 14B:
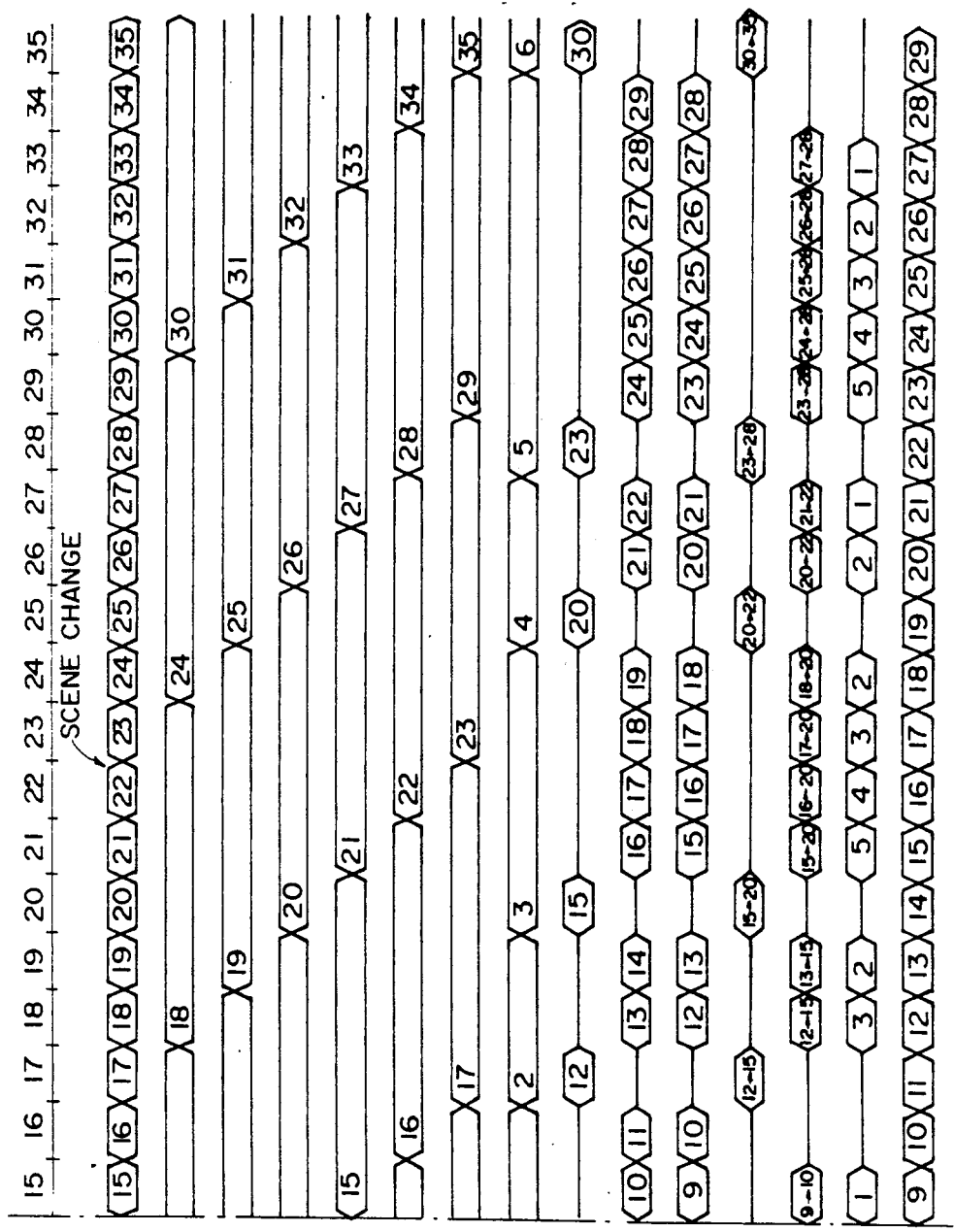
Figure 15:
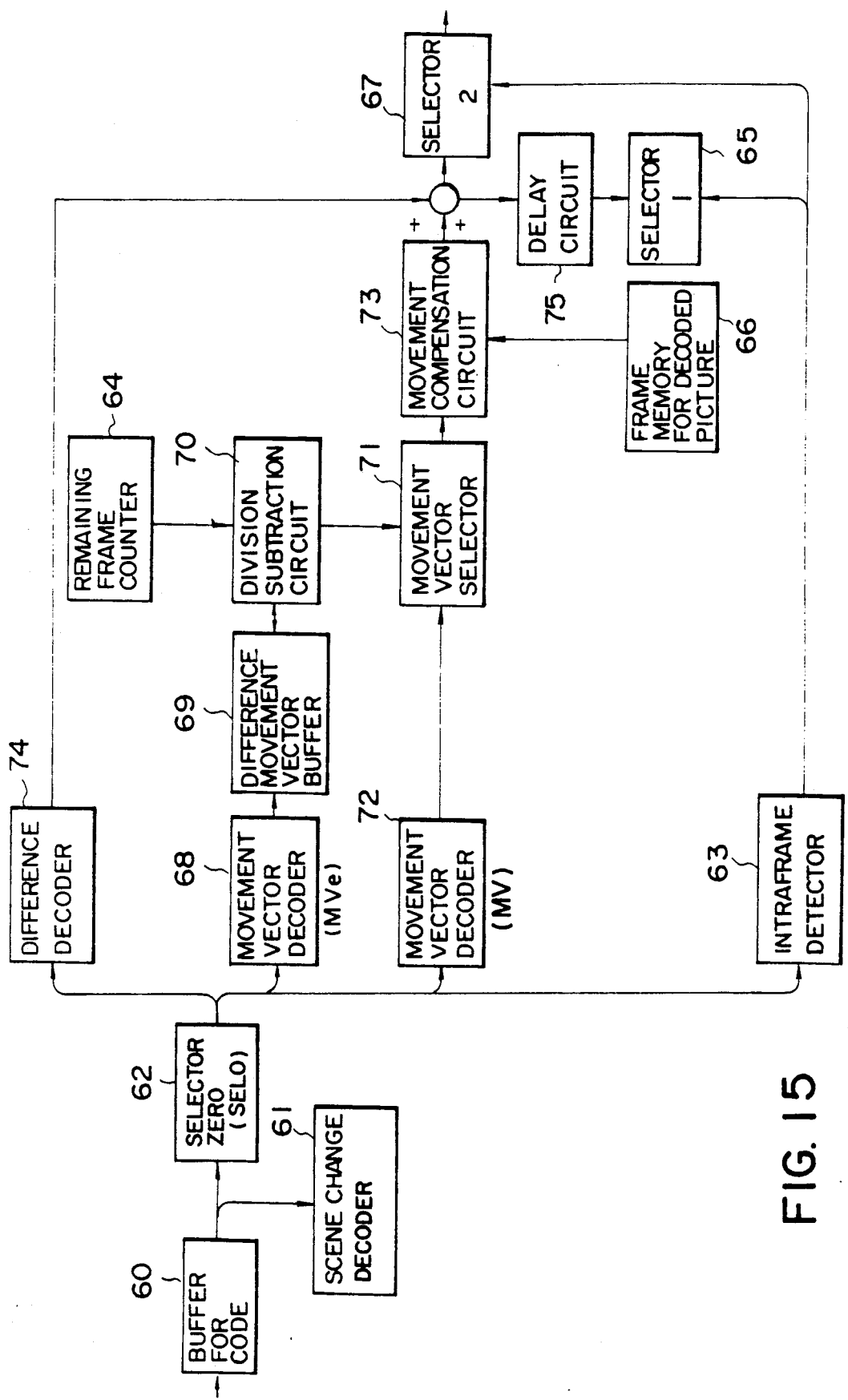
FIG. 15 is a block diagram showing a decoding system according to a third embodiment of this invention.
Figure 16A:
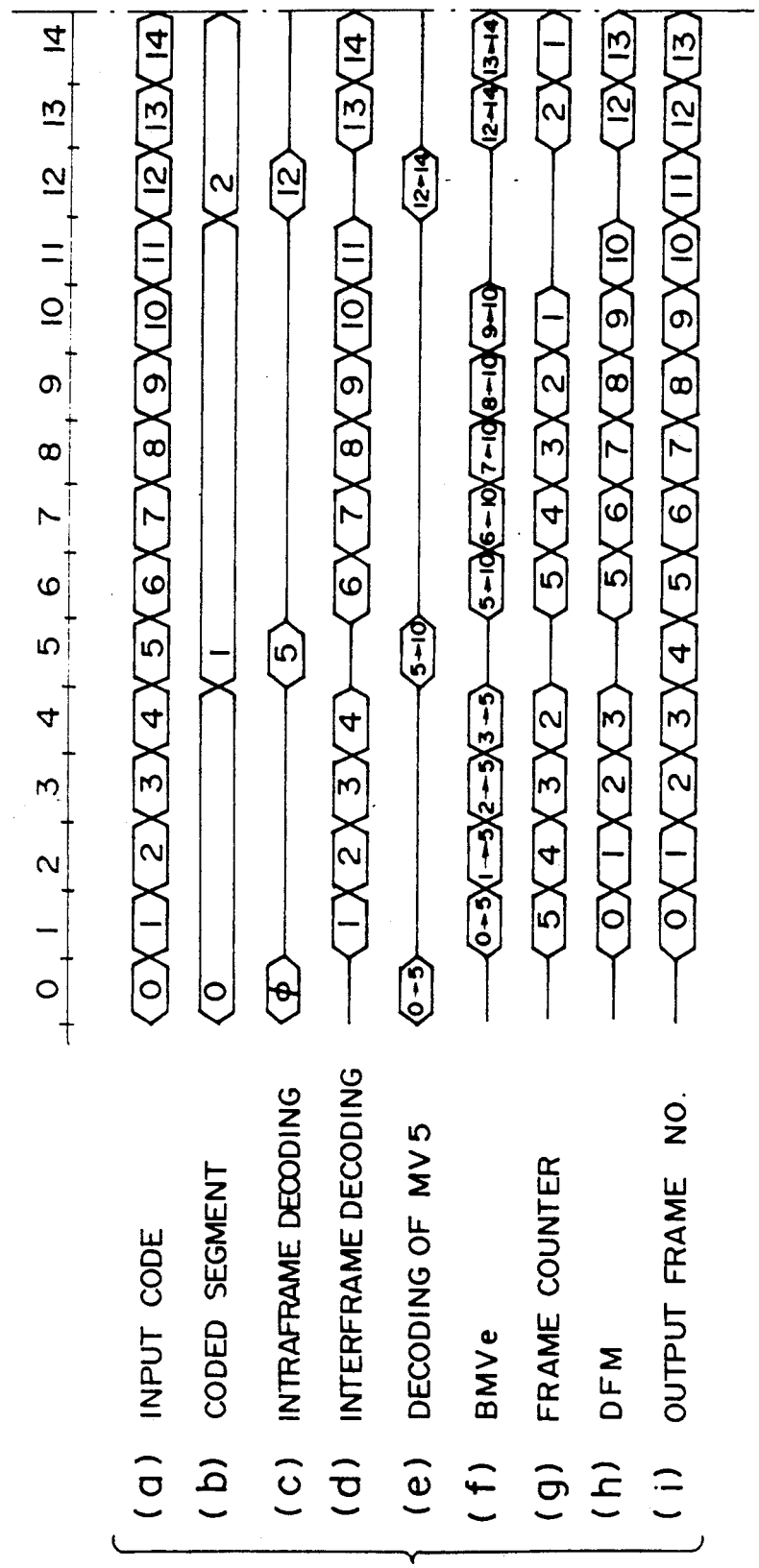
FIG. 16 is a timing chart showing the operation of the decoding system of the third embodiment.
Figure 16B:
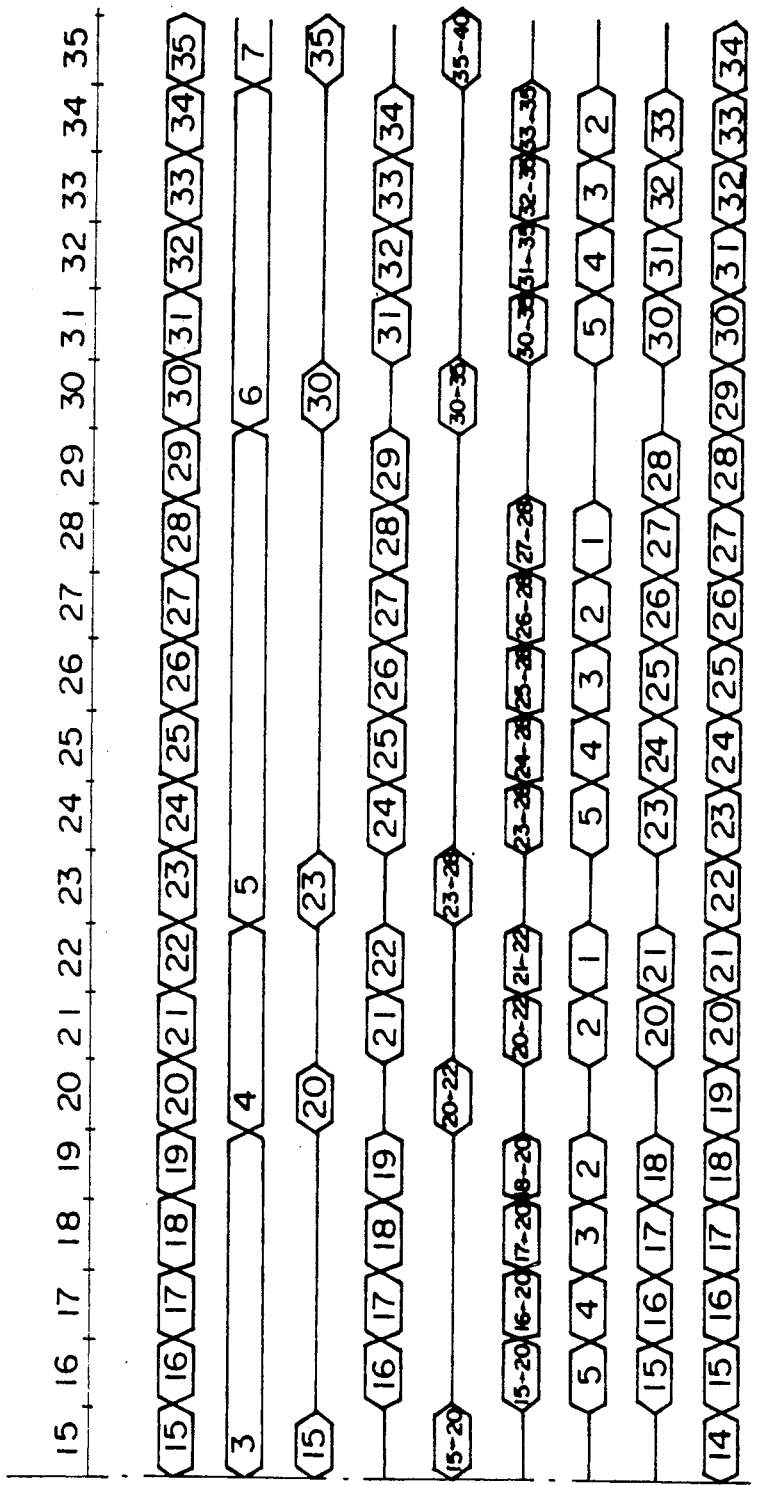

A third embodiment of this invention will now be described with reference to FIGS. 13 to 16. The coding system of the third embodiment is shown in block form in FIG. 13. The same reference numerals as those in FIG. 4 represent the equivalent or corresponding elements, respectively. The timing chart of the coding system is shown in FIG. 14. The decoding system is shown in a block form in FIG. 15 and the same reference numerals as those in FIG. 6 represent equivalent or corresponding elements, respectively. The timing chart of the decoding system is shown in FIG. 16.

It is now assumed that scene changes take place between the eleventh and twelfth frames and between the twenty-second and twenty-third frames, and that coding is conducted from frame zero.

In the third embodiment, where no scene change exists, five frames are assumed as a coded segment and the intraframe coding/decoding is implemented to the first or leading frame of the coded segment. Then, detection of a movement vector is made between the leading frame and the leading frame of the next coded segment. By using the movement vector thus detected, the resolution of the interframe movement vector is improved and the movement compensation interframe coding/decoding of the remaining four frames is carried out. For this reason, a frame memory 90 is added as a new element. FIG. 15 is substantially the same as FIG. 6.

a. Regarding the coding system

The coding system will be first described with reference to FIGS. 13 and 14. During t=0 to 5 in FIG. 14, the 0-th to fifth frames are sequentially delivered through the SEL0 30 to frame memories (FM0 to FM5) 32 to 35 and 90, respectively.

At the SCNG-ENC 36, whether or not a scene charge occurs between the 0-th and fourth frames is determined. Since there is no scene change in this embodiment, a code indicative of no scene change is delivered to the SAF 37.

On the other hand, with respect to the 0-th frame, the intraframe coding is carried out at the ENC-INT 38 through the SEL6 59. A code outputted from the ENC-INT 38 is delivered through the SEL4 39 to the BUF0 40. The code outputted is also delivered to the DEC-INT 41, and undergoes intraframe decoding. The decoded picture thus obtained is delivered through the SEL3 42 to the DFM 43.

By the above-described processing, the intraframe coding of the 0-th frame is completed. Thereafter, at t=6 in FIG. 14, the sixth frame is inputted through the FM0 31.

Because no scene change exists also between the 0-th frame and the fifth frame, the 0-th frame and the fifth frame are delivered through the SEL1 44 to a movement vector detection circuit (hereinafter abbreviated as MC5) 91—substitute for MC4 45 in FIG. 4—and detection of the movement vector (MV5) between five frames is made during t=5. The movement vector detected (MV5) is delivered to the ENC-MVe 46 and is coded thereat, and is also delivered to the BMVe 47, at which initialization of the difference movement vector (MVe) is carried out.

Then, the first frame is read out through the SEL2 48 from the FM1 32 and a decoded picture of the 0-th frame is read out from the DFM 43. They are both delivered to the MC0 49. At the MC0 49, detection of a movement vector (MV0) is made. The movement vector thus detected is delivered to the movement vector judgment circuit (SEL-MV).

On the other hand, a difference movement vector (MVe) corresponding to the movement vector (MV0) is inputted from the BMVe 47 to the CAL-MVei 51.

Since no scene change is detected in this case, "5" is delivered, to the CAL-MVe 51, from the FCNT 52 for counting the number of remaining frames of which content is set to "5". Then, an estimated movement vector (MVei=MVe/5) is delivered from the CAL-MVei 51 to the movement vector judgment circuit (SEL-MV).

Where a predictive movement vector (MVei) exists in the vicinity of the movement vector (MV0), the SEL-MV 50 selects the predictive movement vector (MVei) as a movement vector (MV) between the 0-th frame and the first frame. In contrast, where no predictive movement vector (MVei) exists in the vicinity of the movement vector (MV0), the SEL-MV 50 selects the movement vector as the movement vector (MV) between the 0-th frame and the first frame.

The movement vector (MV) thus selected is delivered to the CAL-MVei 51. A vector obtained by subtracting the movement vector (MV) from the difference movement vector (MVe) at the CAL-MVei 51 is inputted as a difference movement vector to the BMVe 47. The movement vector (MV) is delivered to a still picture judgment circuit (MVCK)—not show—and it is used to determine whether or not a subject picture is a still picture. Then, this movement vector (MV) is coded at the ENC-MV 53 and the coded movement vector is delivered to the SAF 37.

Furthermore, the movement vector (MV) is delivered to the MC0 49. When the element of the movement vector (MV) is an integer, the MC0 49 outputs a pixel value indicated by the movement vector (MV) in the DFM 43. In contrast, when it is not an integer, the MC0 49 outputs a value predicted from pixels in the vicinity of the coordinate indicated by the movement vector (MV) in the DFM 43. A difference between the pixel obtained as stated above and a corresponding pixel read from FM1 32 through the SEL2 48 is coded at the ENC-DIF 54.

Then, the code indicative of the difference is delivered to the SAF 37 and is decoded at the DEC-DIF 55. The decoded picture is formed by the sum of the code indicative of the difference and an output from the MC0 49 and is delayed at the FD 56. Then, it is delivered to DFM 43 through the SEL3 42. After SAF 37 multiplexes the four kinds of codes delivered, it delivers them through the AFL4 39 to the BUF0 40.

When these codes are judged as a moving picture by still picture judgment at the MVCK (not shown), the BUF0 40 adds a code indicative of the moving picture to the multiplexed code to deliver it through the SEL5 57 to the BUF1 58. On the other hand, when those codes are judged as a still picture as a result of the still picture judgment, the BUF0 40 adds a code indicative of the still picture to the multiplexed code to conduct a high-precision coding at the ENC-INT 38 to output these codes through the SEL5 57 to the BUF1 58. Thus, the BUF1 58 outputs codes stored therein to the transmission path in dependency upon the state of the transmission path.

By the above-described processing, the movement compensation interframe predictive coding of the first frame is completed at the time t=6 in FIG. 14. As a result, the value of the remaining counter becomes equal to "4". At the time t=7, the seventh frame is inputted through the SEL0 30 to the FM1 32.

At t=7, the movement compensation interframe predictive coding of the second frame is carried out by a processing similar to the above between the decoded picture of the first frame in the DFM 43 and the second frame of the FM2 33. Furthermore, by a processing similar to the above, at t=8, the movement compensation interframe predictive coding of the third frame is carried out by a processing similar to the above, and at t=9, the movement compensation interframe predictive coding of the fourth frame is carried out. By the above-described processing, at time t=9, coding of the 0-th segment to be coded of the 0-th frame to the fourth frame is completed.

Then, at t=10, the fifth to the tenth frames exist at FM0 31 to FM4 35 and FM5 90, respectively. At t=10, the intraframe coding of the fifth frame in the FM5 90 is similarly carried out. Then, the fifth frame in the FM5 90 and the tenth frame in the FM4 35 are selected at the SFL0 30, and the movement vectors (MV5) of the fifth and tenth frames are determined.

At t=11 to 14, the movement compensation interframe predictive coding of the sixth, seventh, eighth and ninth frames is similarly carried out. At t=13, a scene change between the eleventh and the twelfth frame is detected at the SCNG-ENC 36. The tenth and eleventh frames are incorporated into the first coded segment to carry out the movement compensation interframe predictive coding.

The coding of the tenth frame at t=15 is carried out by the movement vectors of the BMVe 47 and the movement vector of the ninth and tenth frames. Furthermore, coding of the eleventh frame at t=16 is carried out by the movement vectors of the tenth and eleventh frames.

Because a scene change exists in this case, the next segment to be coded becomes the twelfth to fourteenth frames. At t=17, the intraframe coding of the twelfth frame which is the leading frame of the second segment to be coded is carried out, and movement vectors between the twelfth to fifteenth frames are determined. At t=18, the content of the frame counter becomes equal to "3". Thus, the movement compensation interframe predictive coding of the thirteenth frame is carried out by using the difference movement vector and the interframe movement vector. At t=19, the content of the frame counter becomes equal to "2". Thus, the movement compensation interframe predictive coding of the fourteenth frame is carried out using the difference movement vector and the interframe movement vector.

Similarly, since no scene change exists in the next segment to be coded, the segment subject to coding becomes the fifteenth to nineteenth frames. At $t=20$, the intraframe coding of the fifteenth frame and the initialization of the difference movement vector are carried out. At $t=21$ to 24, the movement compensation interframe predictive coding of the sixteenth to nineteenth frames is carried out using the difference movement vector and the interframe movement vector.

At $t=24$, a scene change is detected between the twenty-second and twenty-third frames. The segment to be coded becomes the twentieth to twenty-second frames. In a manner similar to that of the twelfth to fourteenth frames, the intraframe coding of the twentieth frame is carried out at $t=25$. At $t=26$ and 27, the movement compensation interframe predictive coding of the twenty-first and twenty-second frames is carried out using the difference movement vector and the interframe movement vector.

Since the scene change has existed in this case, the segment to be coded becomes the twenty-third to twenty ninth frames. In a manner similar to that of the fifth to eleventh frames, the intraframe coding of the twenty-third frame is carried out at $t=28$. At $t=29$ to 33, the movement compensation interframe predictive coding of the twenty-fourth to twenty-eighth frames is carried out using the difference movement vector and the interframe movement vector. Finally, at $t=34$, the movement compensation interframe predictive coding of the twenty-ninth frame is carried out using only the interframe movement vector of the twenty-eighth and twenty-ninth frames.

As stated above, even under circumstances where some scene change exists, an approach is employed to adaptively determine a segment to be coded to thereby implement the intraframe coding to the leading frame of the segment to be coded to determine a movement vector relative to a frame preceding by five frames at the maximum from the leading frame to implement the movement compensation interframe predictive coding to the remaining frames using the difference movement vector and the interframe movement vector, or only the interframe movement vector, thus making it possible to satisfactorily carry out coding.

b. Regarding the decoding system

The decoding system of the third embodiment will now be described with reference to FIGS. 15 and 16. In the decoding system, a code from the transmission path is once stored in the BUF 60. After the code undergoes adjustment of speed, it is outputted. When a code of the still picture is detected at the SCNG-DEC 61, high-precision decoding is carried out at the DEC-INT 63. Furthermore, when a code of the moving picture is detected at the SCNG-DEC 61, subsequent codes are delivered, every codes, through the SEL0 62, to the DEC-INT 63, the DEC-MV 72, the DEC-MVe 68, and DEC-DIF 74, respectively.

At $t=0$ in FIG. 12, the code of the 0-th frame is subjected to intraframe coding at the DEC-INT 63. This decoded picture is delivered through SEL1 65 to the DFM 66. Then, movement vectors between the 0-th to the fifth frames are decoded at the DEC-MVe 68. The decoded movement vectors are delivered to the BMVe 69.

At $t=1$, the frame counter is set to "5". Thus, a movement vector ($MVei = MVe/5$) between the 0-th to first frames is determined at CAL-MVei 70. Furthermore, the movement vector (MVi) between the 0-th and first frames is decoded at the DEC-MV 72.

At the SEL-MV 71, a vector used in the coding system of the predictive movement vectors (MVei) and the movement vector (MVi) is selected as the movement vector (MV). This movement vector (MV) is delivered to the CAL-MVei 70.

Then, a vector obtained by subtracting the movement vector (MV) from the difference movement vector (MVe) at the CAL-MVei 70 is delivered as a difference movement vector (MVe) to the BMVe 69.

The movement vector (MV) is also delivered from the SEL-MV 71 to the MC0 73. At the MC0 73, a synthesized picture of the first frame is formed. At the DEC-DIF 74, the first frame is decoded by the sum of the decoded difference picture and the synthesized picture. The decoded picture is delayed by the FD 75 and is then delivered to the decode picture frame memory DFM 66 through the SEL1 65.

At $t=2$, the frame counter is set to "4". By using a decoded picture of the first frame in the DFM 66, the second frame is similarly decoded. At $t=3$, the frame counter is set to "3". By using the decoded picture of the second frame in the DFM 66, coding of the third frame is similarly carried out. Furthermore, at $t=4$, the frame counter is set to "2". By using the decoded picture of the third frame in the DFM 66, the fourth frame is similarly decoded. By the above-described processing, decoding of the 0-th segment to be coded is completed.

Since the next segment to be coded is the fifth frame to the eleventh frame, the fifth to ninth frames are decoded in a manner similar to that of the 0-th to fourth frames. Namely, at $t=10$, the content of the frame counter becomes equal to "1". These frames are thus decoded by the difference movement vector between the ninth and tenth frames delivered from the CAL-MVei 70 and the movement vector decoded at the DEC-MV 72. Furthermore, at $t=11$, the eleventh frame is decoded by only the movement vector (MVi) decoded at the DEC-MV 72.

In a manner similar to the above, also in the decoding system, the leading frame of a segment to be coded is subjected to intraframe decoding by the segment to be coded and the number of frames. Thus, a movement vector relative to a frame preceding by five frames at the maximum from the leading frame is decoded. Furthermore, the remaining frames are subjected to the movement compensation interframe predictive coding using the difference movement vector and the interframe movement vector, or only the interframe movement vector. Decoding is therefore performed.

In the interframe movement vector coding of the first to third embodiments, when a predictive movement vector from a difference movement vector is used, one code is allotted, while when an interframe movement vector is used, a code is allotted to a difference vector relative to a movement vector of the preceding block. Where the movement vector of the preceding block is a predictive movement vector from the difference movement vector, a difference vector relative to a movement vector of a block in the vicinity thereof, or a difference vector relative to a prescribed movement vector is used.

Figure 17:
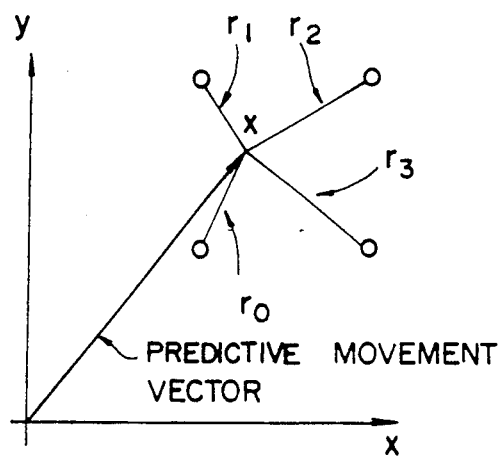
FIGS. 17(a) to 17(c) are characteristic diagrams showing other techniques for computing an estimation value, respectively.
Figure 17:
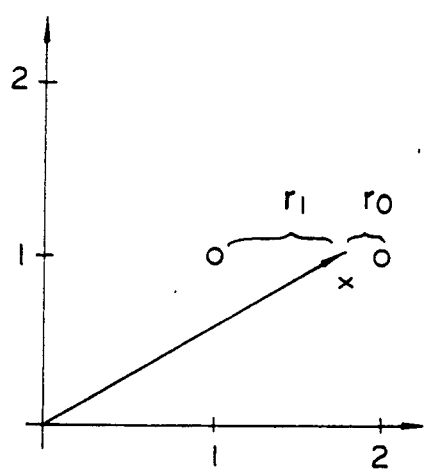
Figure 17:
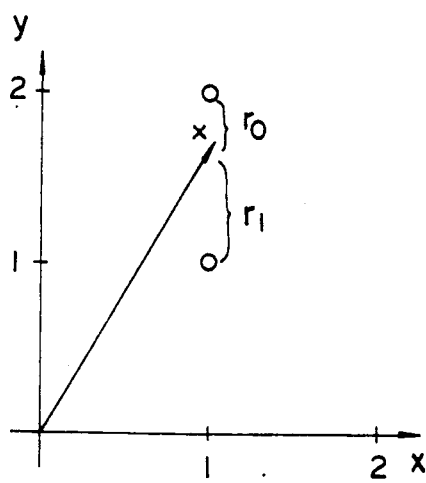

In the computation of an estimated value based on neighboring pixels of the movement compensation by a predictive movement vector from a difference movement vector in the above-described first to third embodiments, when four pixels exist in the vicinity as shown in FIG. 17(a), a position (X) indicated by the predictive movement vector and distances up to four pixels (r0, r1, r2, r3) are used to determine an estimated pixel value, and when a difference with respect to the average value or the central value of the four pixels is larger than a threshold value, distances up to pixels except for that pixel are used to determine an estimated pixel value. Thus, a computation similar to the above is performed also in the decoding system. Furthermore, where two pixels exist in the vicinity as shown in FIGS. 17(b) and (c), distances between the above-mentioned position (X) and two pixels are used to perform a computation of an estimated pixel value. A computation similar to the above is therefore also performed in the decoding system.

The following is a description of the essential parts of the embodiments described previously.

Figure 18:
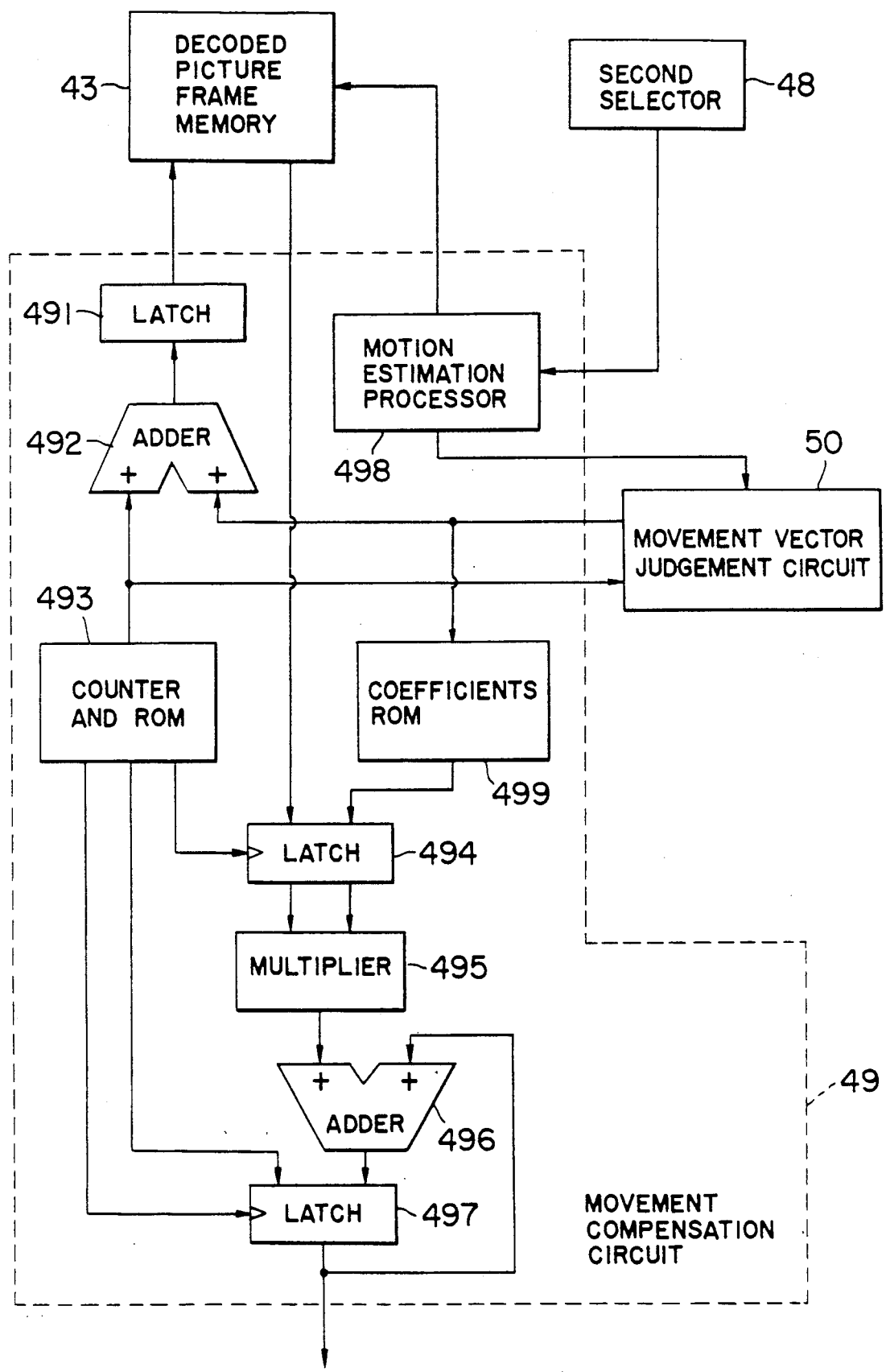
FIG. 18 is a block diagram showing a movement compensation circuit according to each embodiment of the present invention.

FIG. 18 shows a block diagram of the movement compensation circuit 49, in which a motion estimation processor 498 is a commercially available device such as the type STV 3220 motion estimation processor by SGS-THOMSON Microelectronics. The movement vector (MV0) detected by the motion estimation processor 498 is delivered to the movement vector judgment circuit (SEL-MV) 50 which outputs an address upon detection of the picture movements. A counter-and-ROM 493 produces the address and related timing signals for every block within one frame. The addresses output from the counter-and-ROM 493 and the SEL-MV 50 are added by an adder 492 and used to read out picture element data in the decoded picture frame memory (DFM) 43.

The read-out picture element data and the corresponding coefficients read out from a coefficient ROM 499 are multiplied by multiplier 495 and accumulated by an adder 496 and a latch 497 to perform the pixel interpolation.

The motion estimation processor 498 receives signals from the second selector 48 and outputs them to the memory 43 and the SEL-MV 50. The latch 497 latches data from ROM 493 and added signals from the adder 496 by the clock pulses of the counter 493.

Figure 19:
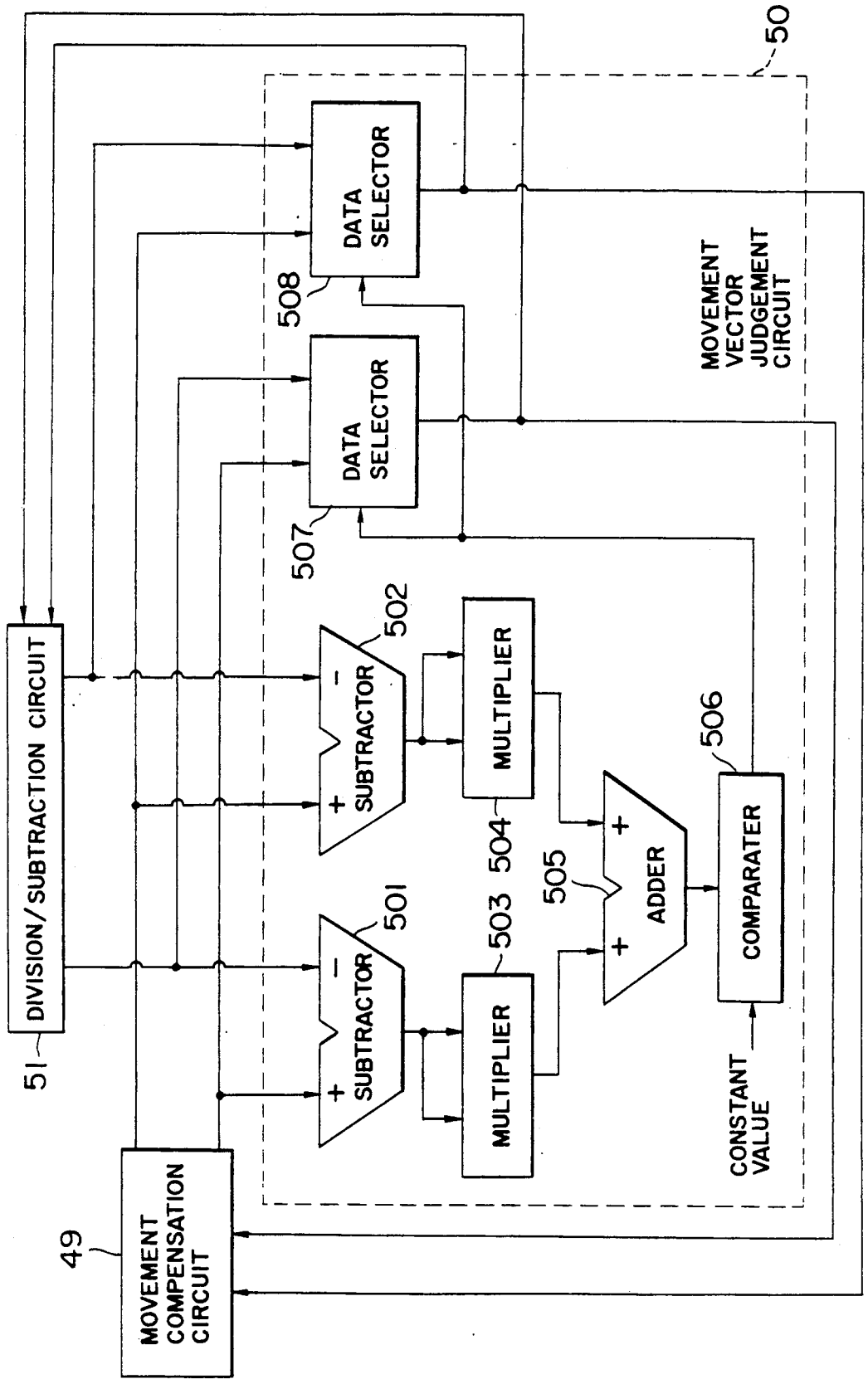
FIG. 19 is a block diagram showing a movement vector judgment circuit according to each embodiment of the present invention.

FIG. 19 shows a block diagram of the movement vector judgment circuit (SEL-MV) 50, which is supplied with the intraframe movement vector from the movement compensation circuit 49 and the predictive movement vector (MVei) from the division/subtraction circuit (CAL-MVei) 51.

The two supplied vectors are differentiated from each other by a subtractor 501 for one dimension and another subtractor 502 for another dimension, each adder output is squared and then added together by multipliers 503, 504 and an adder 505, respectively, to calculate a magnitude of the difference movement vector MVe. The magnitude of the difference movement vector MVe is compared with a constant value, thereafter the movement vector is selectively supplied to the movement compensation circuit (MCΦ) 49 and the division/subtraction circuit (CAL-MVei) 51 by data selectors 507 and 508, respectively.

Figure 20:
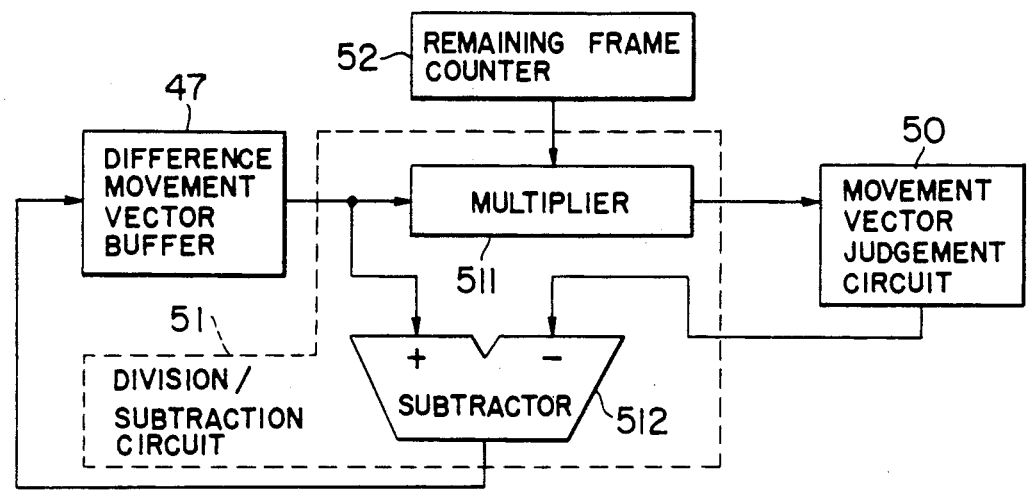
FIG. 20 is a block diagram showing a division/subtraction circuit according to each embodiment of the present invention.

FIG. 20 shows a block diagram of the division/subtraction circuit (CAL-MVei) 51 in relation to the peripheral circuits. The difference movement vector MVe is read out from the difference movement vector buffer (BMVe) 47 and is divided by the number of frames supplied from the remaining frame counter (FM CNT) 52 at a multiplier 511 to obtain the predictive movement vector (MVei) which is then supplied to the movement vector judgment circuit (SEL-MV) 50. The movement vector selected by the movement vector judgment circuit 50 is supplied to a subtractor 512 to subtract it from the difference movement vector MVe, and the resultant vector is supplied to the difference movement vector buffer (BMVe) 47.

Figure 21:
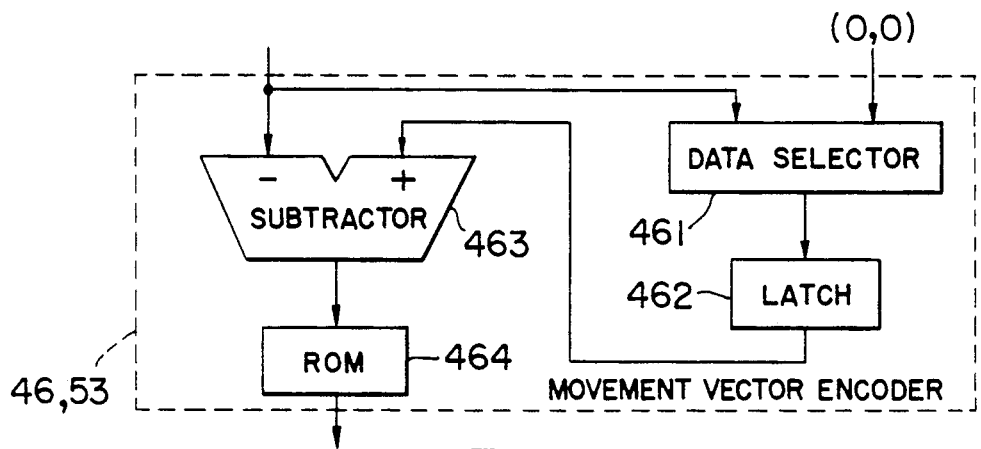
FIG. 21 is a block diagram showing a movement vector encoder according to each embodiment of the present invention.

FIG. 21 shows a block diagram of the movement vector encoder (ENC-MVe) 46 or (ENC-MV) 53. To start the coding, a data selector 461 selects and outputs the initial vector (0, 0) which is subtracted by a subtractor 463 from the input vector inputted to the movement vector encoder 46. And the remainder is supplied to a ROM 464 to output the difference movement vector code. Then, the output difference movement vector code is selected by the data selector 461 and is latched by a latch circuit 462 to subtract from the subsequently inputted vector by the subtractor 463.

Figure 22:
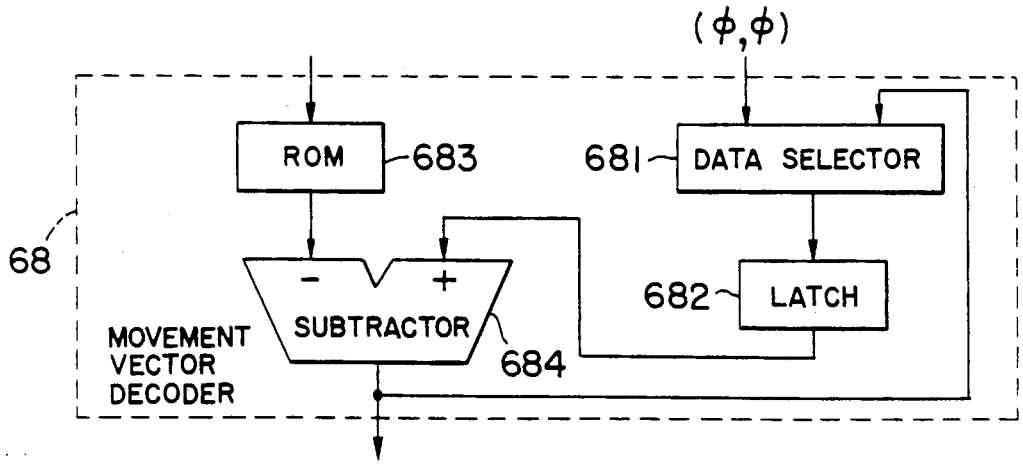
FIG. 22 is a block diagram showing a movement vector decoder according to each embodiment of the present invention.

FIG. 22 shows a block diagram of the movement vector decoder (DEC-MVe, DEC-MV) 68. A ROM 683 outputs the decoded difference movement vector in response to the input code thereto. To start the decoding, a data selector 681 selects and outputs the initial vector (0, 0) which is subtracted from the decoded difference movement vector outputted from a ROM 683 by a subtractor 684, thereby producing the decoded vector. Then, the output decoded vector is selected by the data selector 681 to be latched by a latch 682 to subtract from the subsequently outputted and decoded difference movement vector from the ROM 683. The above process is repeated to decode the movement vectors.

Figure 23:
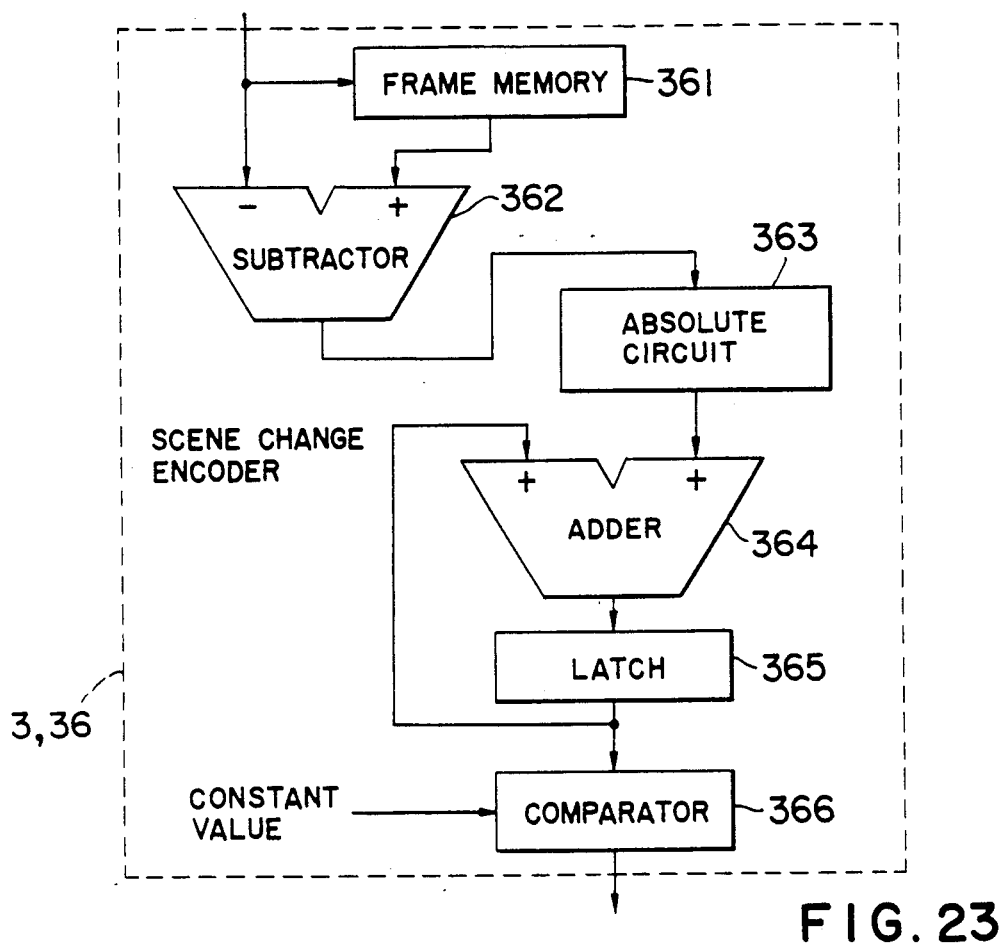
FIG. 23 is a block diagram showing a scene change encoder according to each embodiment of the present invention.

FIG. 23 shows a block diagram of the scene change encoders 3 and 36.

The inputted group of pixels are delayed by a frame memory 361 for one frame period of time and a difference component is produced between the subsequently inputted new group of pixels by a subtractor 362. Then, an absolute value of the difference component is produced by an absolute circuit 363. A series of such absolute values is accumulated for one frame period by an accumulating circuit consisting of an adder 364 and a latch 365. The accumulated value is compared to a constant value by a comparator 366 to output a scene change code as a judgment result.

Figure 24:
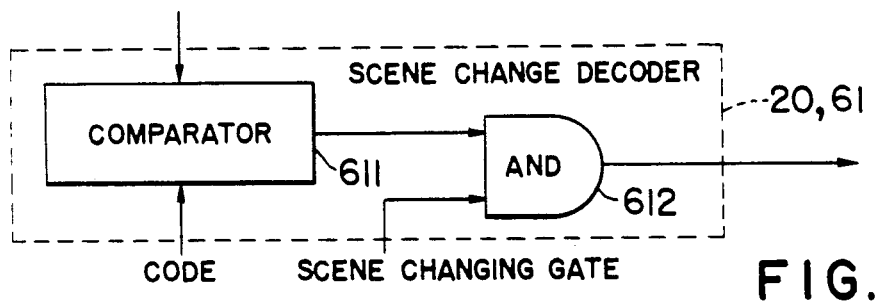
FIG. 24 is a block diagram showing a scene change decoder according to each embodiment of the present invention.

FIG. 24 shows a block diagram of the scene change decoder 20 and 61. A comparator 611 detects the scene change code included in the input signal supplied thereto. The timing of accepting the scene change code is limited by an AND gate 612 according to a scene change gate signal supplied thereto.

FIG. 25 shows a block diagram of the still picture judgment circuit. A comparator 251 detects the movement vector of value (0, 0) is included in the inputted movement vectors, and a number of the value (0, 0) counted by a counter 252. Upon counting the values (0, 0) for one frame period, the output of the counter 252 is compared to a constant value by a comparator 253 to judge the still picture.

It is to be noted that this invention is not limited to the above-described embodiments by any means, but methods modified in design so as to perform the same effect or operation may be included. Furthermore. while coding or decoding is carried out for every frames in the above-described embodiments, such a coding/decoding may be carried out for every field.

As described in detail, in accordance with the movement compensation coding/decoding method according to this invention, not only an interframe movement vector but also a movement vector every M frames are determined to carry out a movement compensation by an estimated value from the above vectors, thus advantageously making it possible to improve the resolution of the movement vector.

Further advantages are as follows. An amount of codes generated is reduced as a result of adaptive prediction of the movement vector, and visual degradation resulting from a difference between movement vectors by the block is reduced.

What is claimed is:

1. A movement compensation predictive coding method where a frame of picture information to be processed is divided into blocks and a movement vector is obtained by comparing corresponding picture information in the divided blocks between frames, and producing coded picture signal based on the movement vector, said coding method including:
    a first step of detecting a movement vector $MV_M$ which is a difference between a N-th frame ($N \geq 0$) and a (N+M)-th frame ($M \geq 2$) of a series of inputted frames of picture signal, said movement vector $MV_M$ being assumed as an initial value of a difference movement vector MVe, and to detect a movement vector MVi which is a difference between the (N+1)-th frame (i=0, 1, 2, ..., M−1) and (N+i+1)-th frame;
    a second step wherein when a detected movement vector MVi exists in the vicinity of a predictive movement vector MVe/(M−i) predicted from the difference movement vector MVe, the predictive movement vector MVe/(M−i) is assumed as a correct movement vector, and a movement compensation predictive coding is performed on a frame of pixels to be processed presently based on pixels predicted from adjacent pixels in a vicinity of a coordinate indicated by the predictive movement vector MVe/(M−i), and obtaining a first subsegment difference movement vector by subtracting the predictive movement vector MVe/(M−i) from the difference movement vector MVe; and
    a third step wherein when no detected movement vector MVi exists in the vicinity of a predictive movement vector MVe/(M−i), the detected movement vector MVi is assumed a movement vector, and a movement compensation predictive coding is performed on a frame of pixels using the movement vector MVi, and obtaining a second subsegment difference movement vector by subtracting the movement vector from the difference movement vector MVe.

2. A movement compensation predictive coding method as set forth in claim 1, wherein when the magnitude of a movement vector $MV_M$ every M frames exceeds above a threshold value, a movement vector between the (N+i)-th frame and the (N+i+1)-th frame is used in place of a movement vector predicted from a difference movement vector.

3. A movement compensation predictive coding method as set forth in claim 1, wherein when a movement vector predicted from a difference movement vector is used in coding a movement vector, one code is allotted to jointly encode a movement vector between the (N+i)-th frame and the (N+i+1)-th frame.

4. A movement compensation predictive coding method as set forth in claim 1, which further includes:
    a step of implementing an intraframe coding to a frame at the time of start of coding and after scene change, and determining movement vectors between M frames every M frames of A×M frames where K is the number of frames between scene changes and is expressed as A×M+B (A is an integer, B>M) to carry out a movement compensation interframe predictive coding to add a code indicating that coding has been carried out every M frames, and
    a step of adding a code indicating that coding has been carried out every B frames to each of said B frames, and determining movement vectors between B frames to carry out a movement compensation interframe predictive coding, or implementing a movement compensation interframe predictive coding using an interframe movement vector to said B frames.

5. A movement compensation predictive coding method as set forth in claim 1, which further includes:
    a step of implementing an intraframe coding every segments to be coded consisting of M frames and a movement compensation interframe predictive coding using movement vectors between M frames,
    a step of implementing an intraframe coding to core frames of (M/2)+1 frames when M is an odd number, and to core frames of M/2 or (M/2)−1 frames when M is an even number,
    a step wherein in the case where a scene change exists within M frames, when that scene change is before the core frame, a frame before scene change is incorporated into a segment to be coded immediately before the last mentioned frame, and when that scene change is after a scene change, a frame after the scene change is incorporated into a segment to be coded immediately after the last mentioned frame to carry out a movement interframe predictive coding using interframe movement vectors, and
    a step of implementing an intraframe coding using one frame of the remaining frames as a core frame, and implementing a movement compensation interframe predictive coding using movement vectors between said remaining frames and the interframe movement vectors, thus to code the number of frames within the segment to be coded as well.

6. A movement compensation predictive coding method as set forth in claim 1, which further includes:
    a step of implementing an intraframe coding every segments to be coded consisting of M frames and a movement compensation interframe predictive coding using movement vectors between M frames, and implementing an intraframe coding using the leading frame as a core frame,
    a step wherein in the case where a scene change exists between M frames, when that scene change is before the central frame, a frame before said scene change is incorporated into a segment to be coded immediately before the last-mentioned frame, and when said scene change is after said central frame, a frame after said scene change is incorporated into a segment to be coded immediately after the last mentioned frame, and
    a step of implementing an intraframe coding using the leading frame of the remaining frames as a core frame, and implementing a movement compensation interframe predictive coding using movement vectors between said remaining frames and interframe movement vectors, thus to encode the number of frames within said segment to be coded.

7. A movement compensation interframe predictive decoding method for decoding coded data which has been undergone a movement compensation coding by the method described in claim 1, which includes:

a fourth step wherein a difference movement vector is used in coding, a predictive decoding is carried out using pixels predicted by the same predictive means as that of said coding system by pixels in the vicinity of a coordinate indicated by a predictive movement vector MVe/(M−i) predicted from said difference movement vector to take, as a next difference movement vector, a vector obtained by subtracting said predictive movement vector MVe/(M−i) from said difference movement vector, and a fifth step wherein when a predictive coding is being implemented using a movement vector (MVi) between the (N+i)-th frame and the (N+i+1)-th frame, said movement vector MVi is used to carry out an interframe predictive decoding, thus to take, as a next difference movement vector, a vector obtained by subtracting said movement vector MVi from said difference movement vector MVe.

8. A movement compensation interframe predictive decoding method as set forth in claim 7, which further includes:

a step of determining a difference between frames every M frames to take it as a still picture when said difference is less than a predetermined value to transmit a code indicative of the still picture and to decode coded data by only the intraframe coding.

9. A movement compensation interframe decoding method as set forth in claim 7, which further includes:

a step of determining a movement vector between frames every M frames to take it as a still picture when the number of zero vectors of the movement vector is above a predetermined value and the magnitude of movement vectors except for said zero vectors is less than a predetermined value to transmit a code indicative of the still picture and to decode coded data by only an intraframe coding.

10. A movement compensation interframe predictive decoding method as set forth in claim 7, wherein the frame is processed for every field.

* * * * *